May 13, 1958    I. C. MAXWELL ET AL    2,834,523
SHIRT PRESSING MACHINE

Filed May 13, 1955                    12 Sheets-Sheet 1

INVENTORS
IRA C. MAXWELL
BY OLE H. LANGEN
CALVIN E. PIILOLA
Paul, Moore & Rugger
ATTORNEYS May 13, 1958 I. C. MAXWELL ET AL 2,834,523
SHIRT PRESSING MACHINE
Filed May 13, 1955 12 Sheets-Sheet 2

INVENTORS
IRA C. MAXWELL
BY OLE H. LANGEN
CALVIN E. PIILOLA
Paul Moore & Rogger
ATTORNEYS

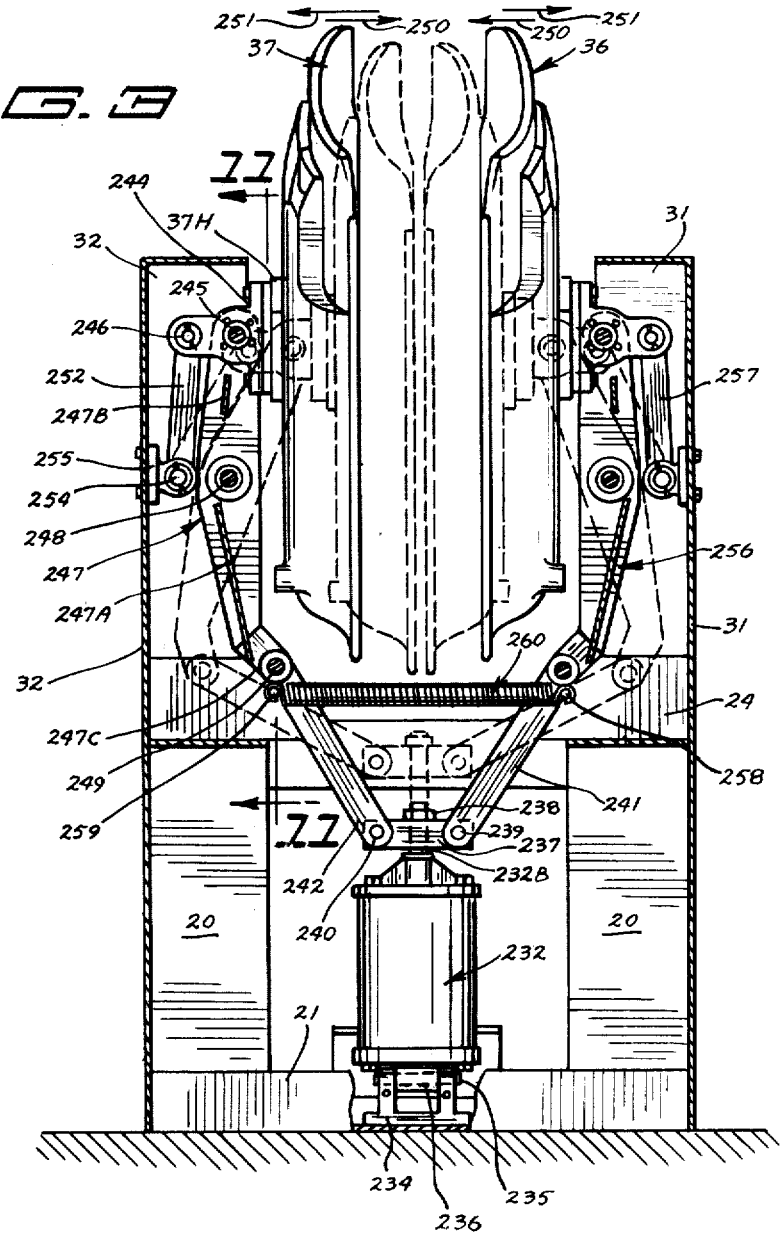

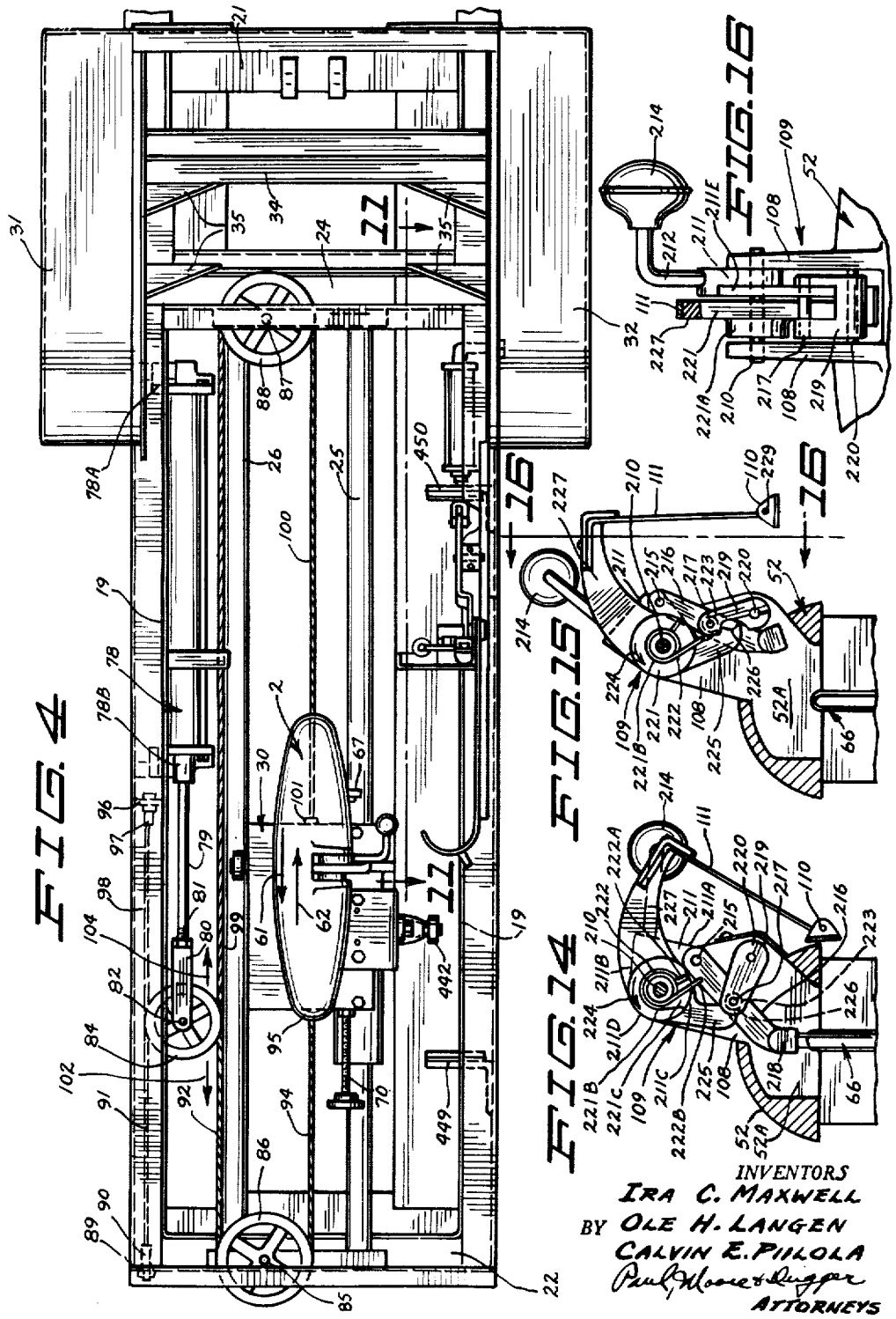

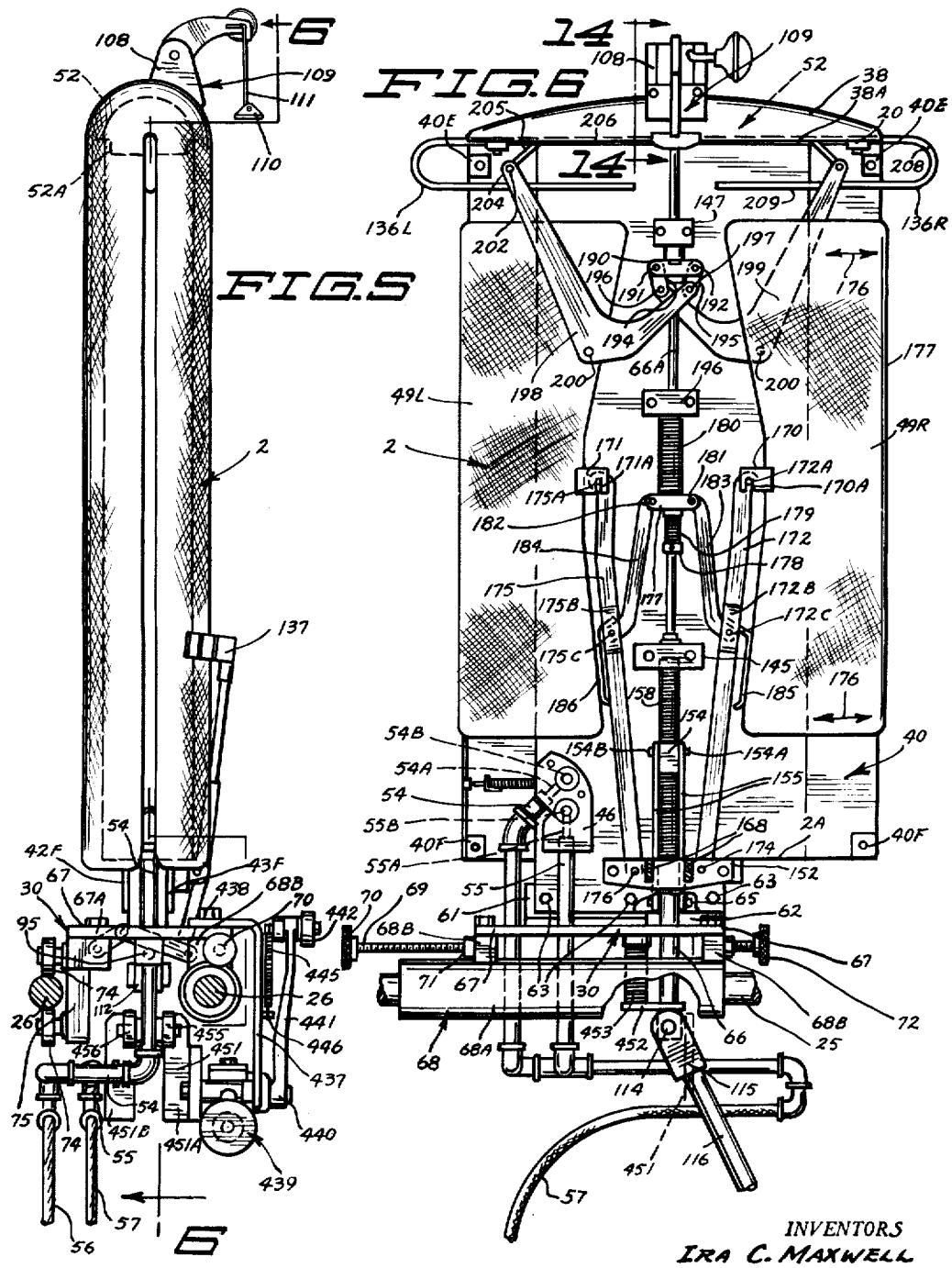

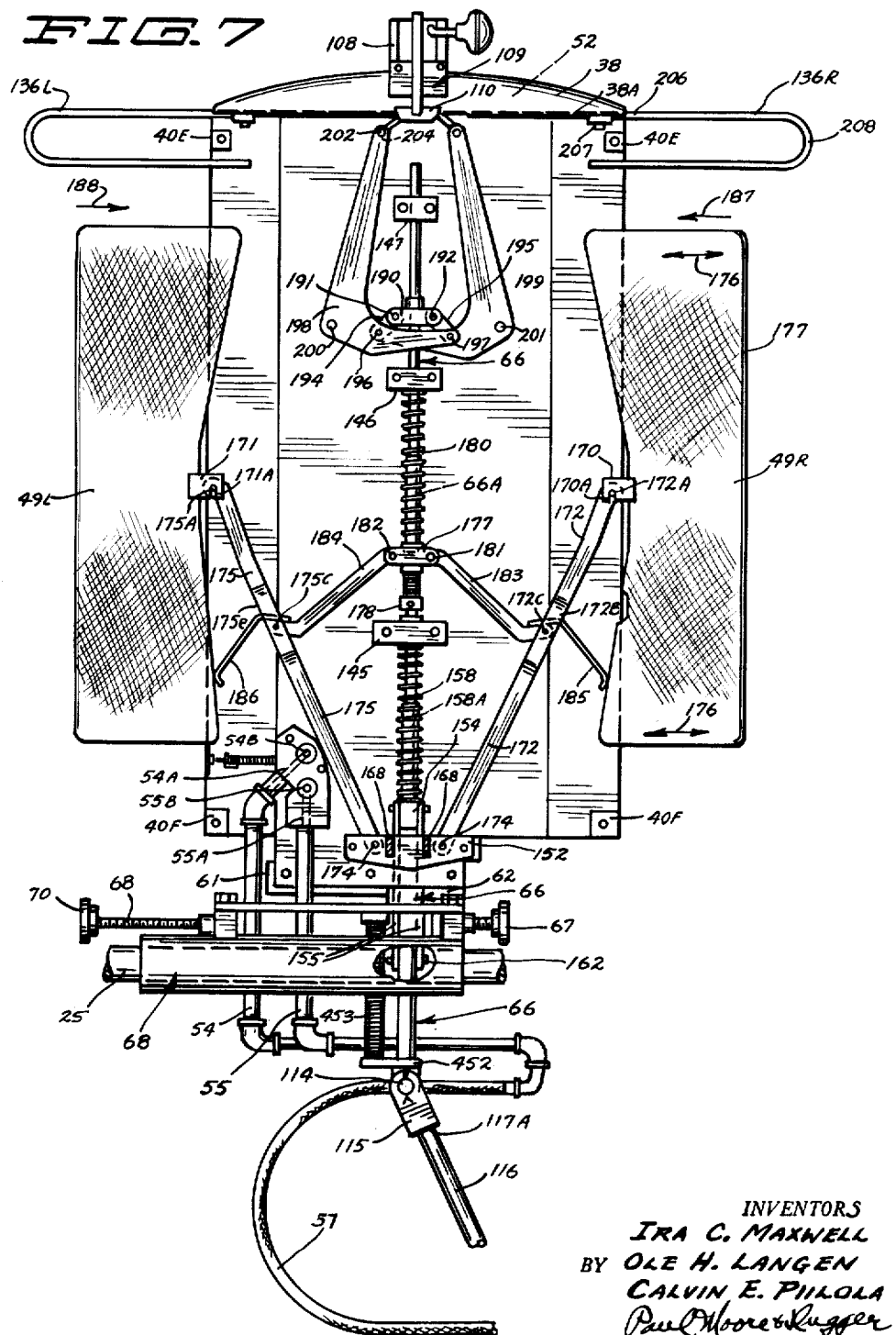

May 13, 1958    I. C. MAXWELL ET AL    2,834,523
SHIRT PRESSING MACHINE
Filed May 13, 1955    12 Sheets-Sheet 7
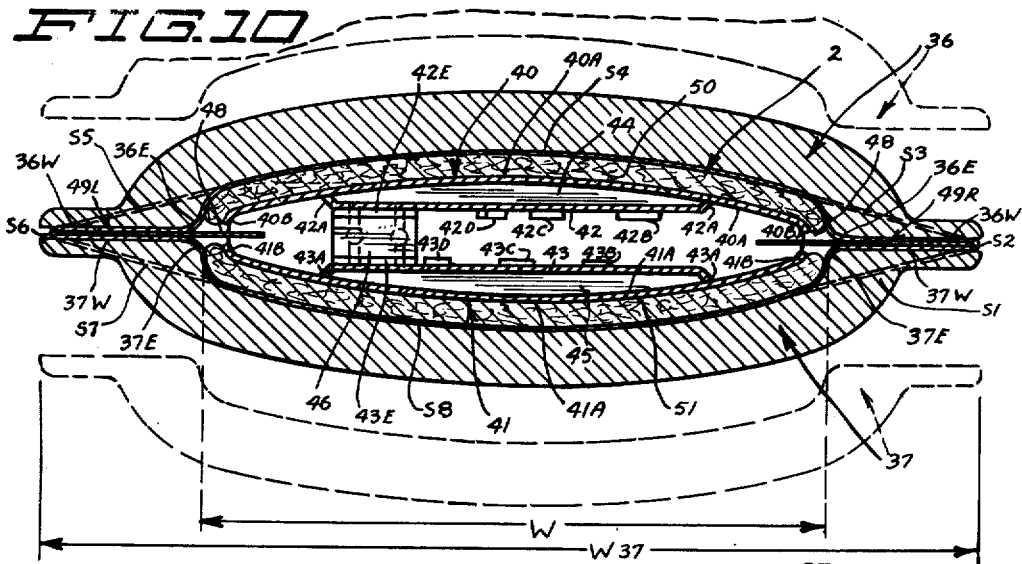
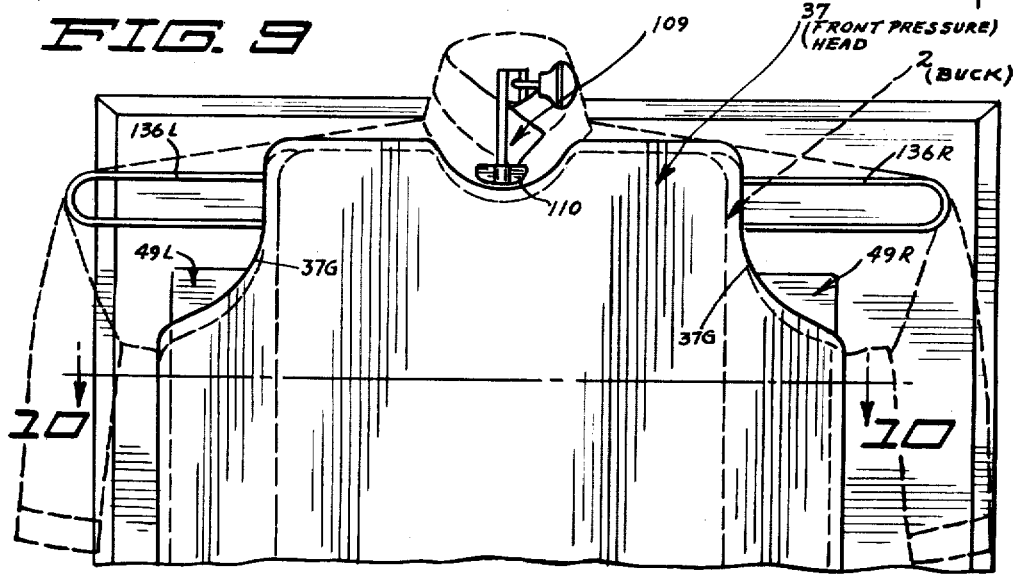
INVENTORS
IRA C. MAXWELL
BY OLE H. LANGEN
CALVIN E. PIILOLA
Paul, Moore & Dugger
ATTORNEYS

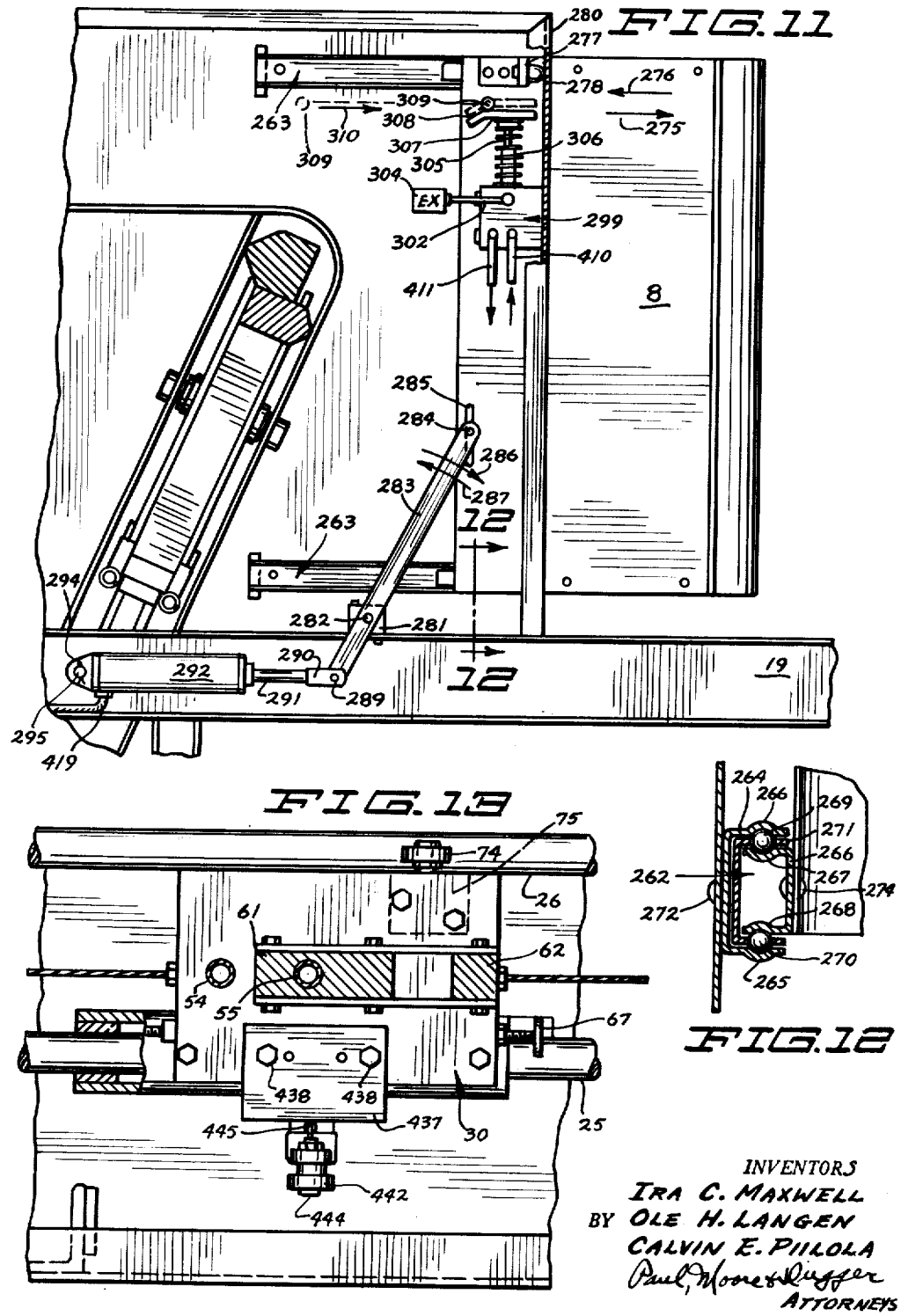

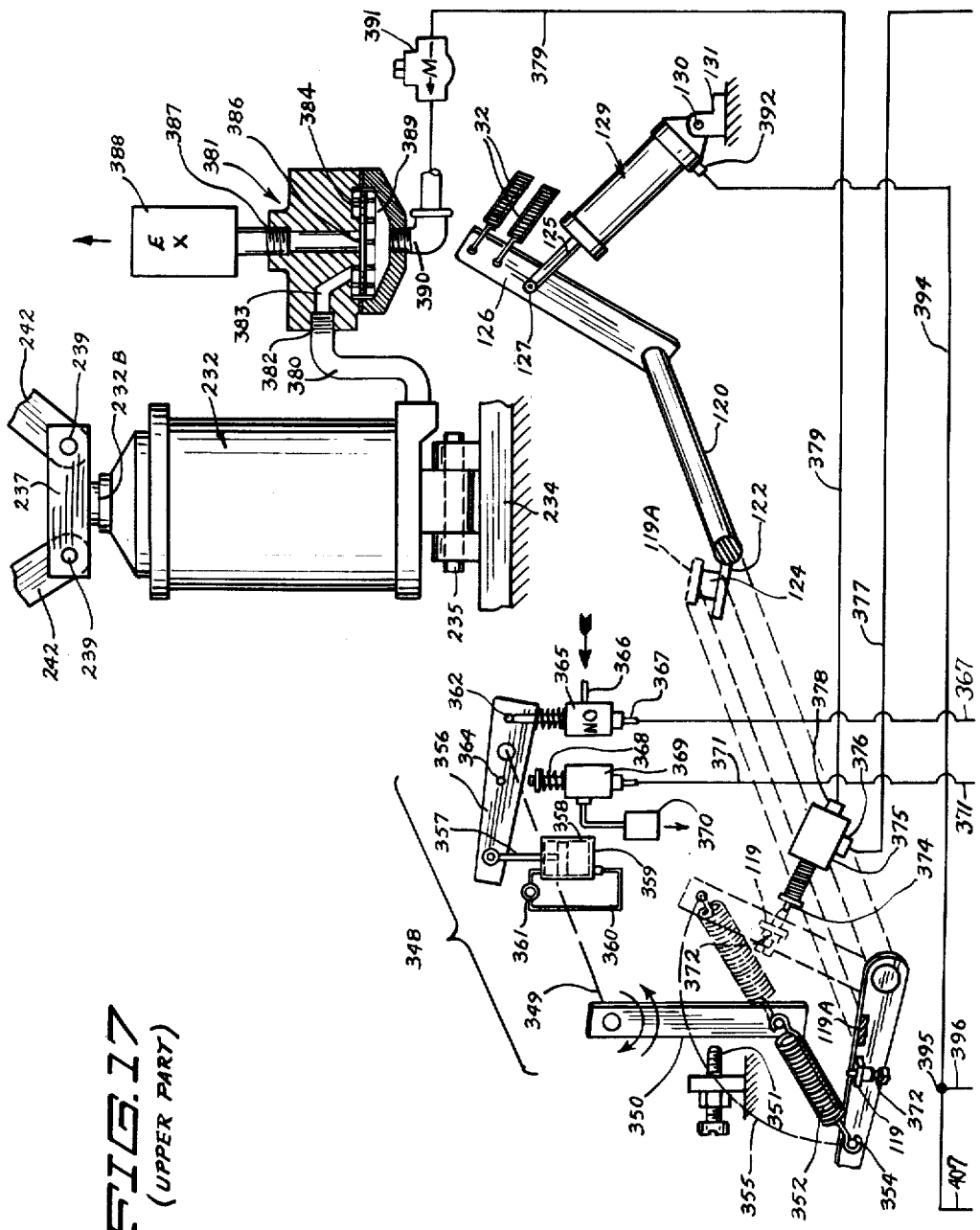

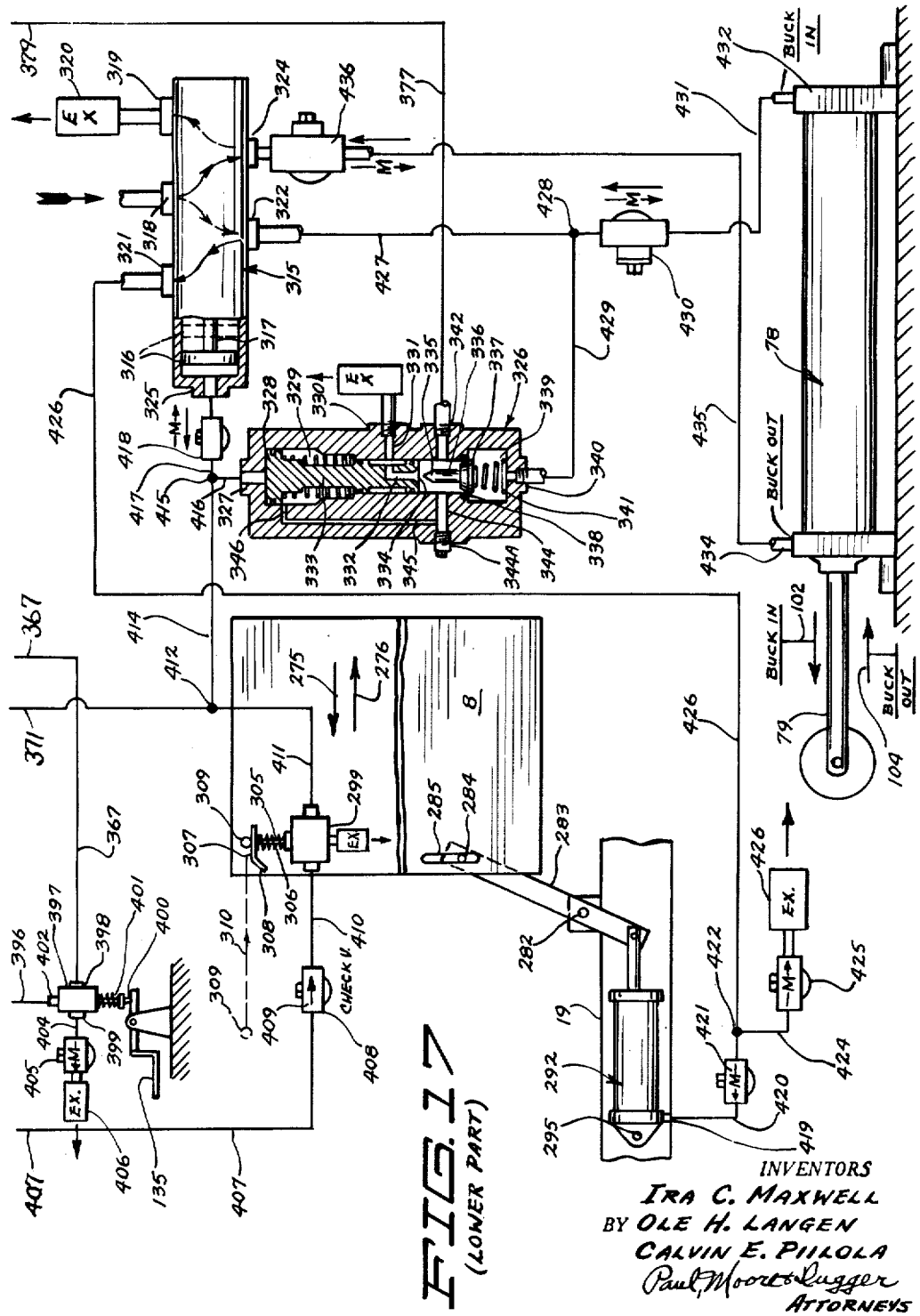

May 13, 1958     I. C. MAXWELL ET AL     2,834,523
SHIRT PRESSING MACHINE
Filed May 13, 1955                      12 Sheets-Sheet 11
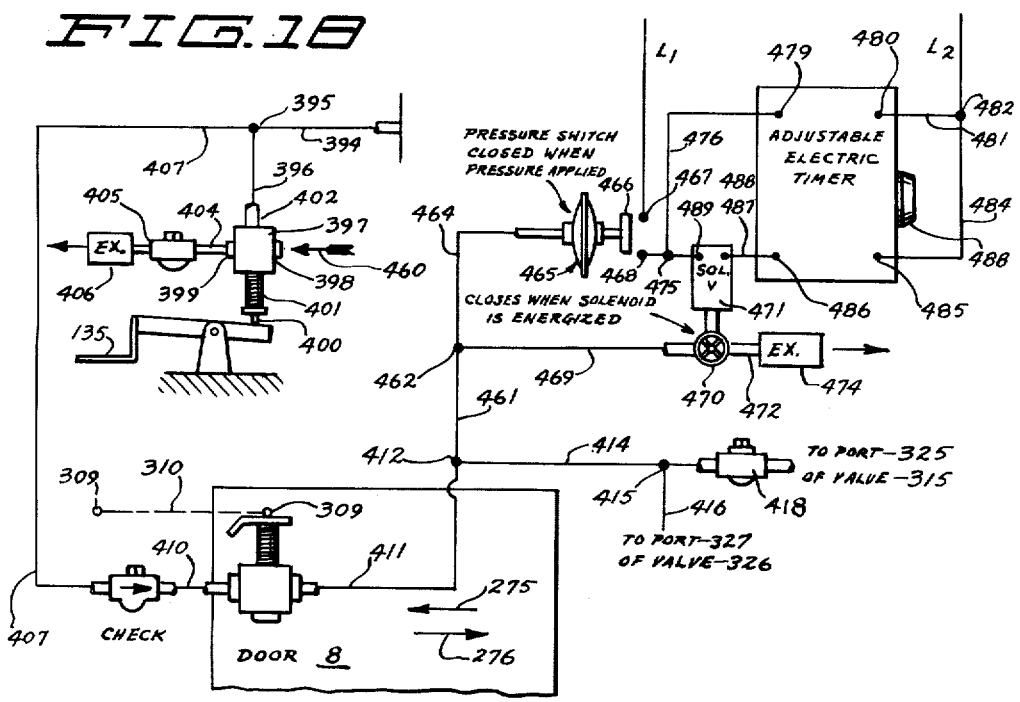
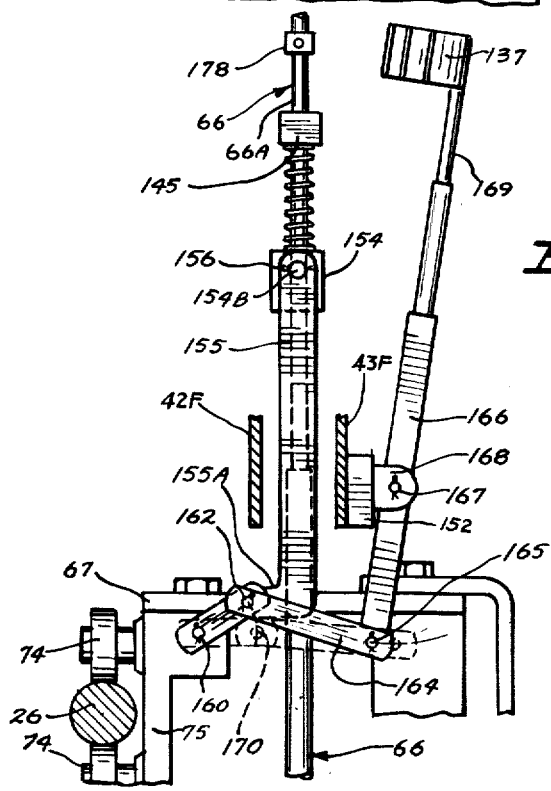
INVENTORS
IRA C. MAXWELL
BY OLE H. LANGEN
CALVIN E. PIILOLA
Paul, Moore & Lugger
ATTORNEYS May 13, 1958  I. C. MAXWELL ET AL  2,834,523
SHIRT PRESSING MACHINE
Filed May 13, 1955  12 Sheets-Sheet 12
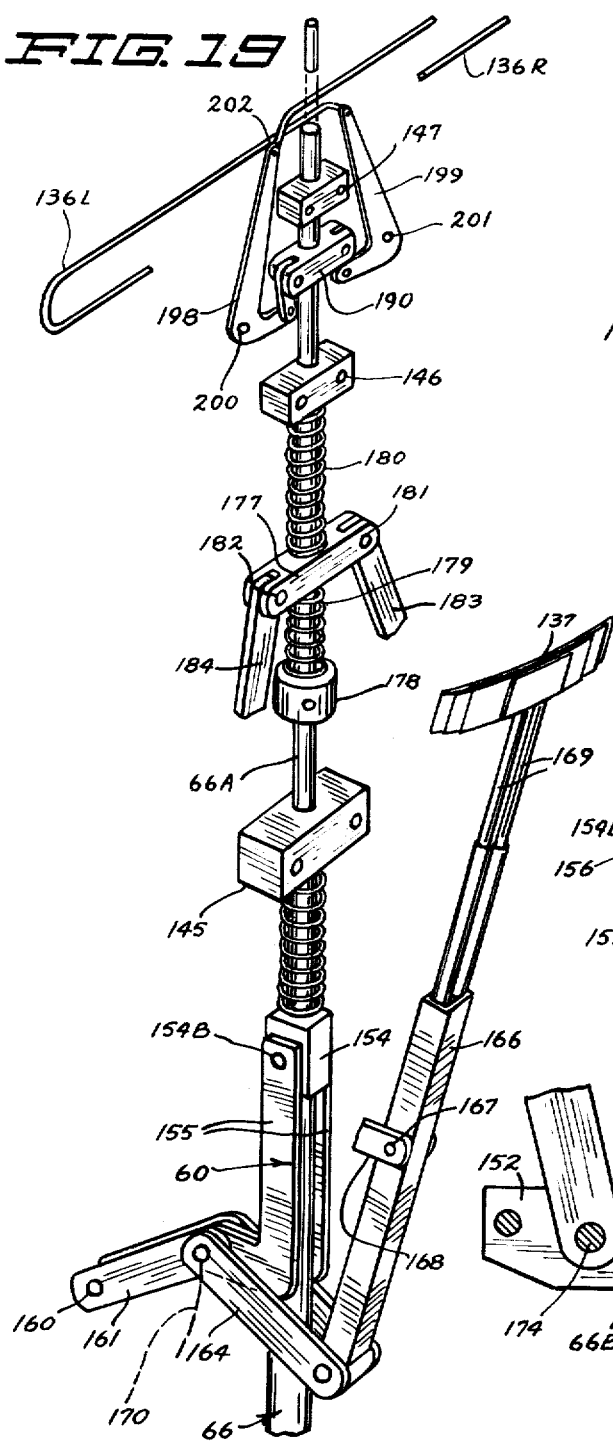
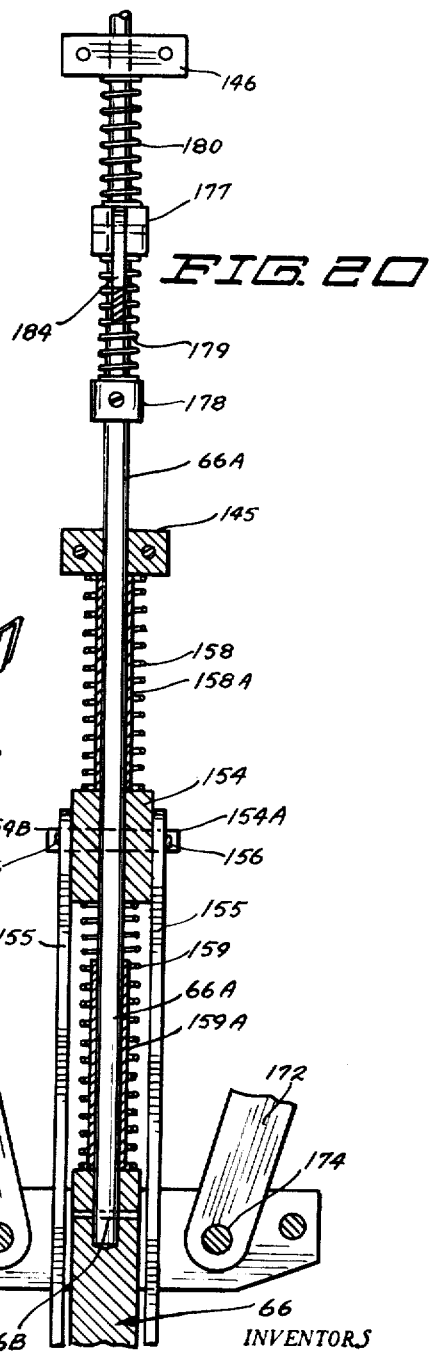
INVENTORS
IRA C. MAXWELL
BY OLE H. LANGEN
CALVIN E. PIILOLA
Paul, Moore & Rupper
ATTORNEYS

United States Patent Office 2,834,523
Patented May 13, 1958

2,834,523

SHIRT PRESSING MACHINE

Ira C. Maxwell, Richfield, and Ole H. Langen and Calvin E. Pillola, Minneapolis, Minn., assignors to The Unipress Company, Incorporated, Minneapolis, Minn., a corporation of Minnesota Application May 13, 1955, Serial No. 508,142

33 Claims. (Cl. 223—57)

This invention relates to improvements in apparatus for the pressing of men's shirts, and more particularly, to improvements in that class of shirt pressing machines which are especially contrived for the pressing of the body portion of the shirt in one operation.

In the laundry art there have been provided in more recent years, machines especially contrived for the pressing of particular portions of shirts. Thus, machines having thereon bucks particularly shaped for the pressing of collar and cuffs are provided, as well as machines for the pressing of the sleeve portions of shirts, for pressing the yoke portions and the body portions of the shirt. In more recent developments in the laundry pressing machines there are provided machines of great ingenuity which are capable in a single operation of pressing the two sleeves of a short from the cuff to the yoke. In the modern laundry, the machines for pressing shirts are grouped together so that several operators, working a plurality of machines as a team, can completely finish the men's shirts in a sequence of carefully related operations. Heretofore, the pressing of the body portions of the shirt has been accomplished on a flat bed press, known as a bosom press, and required the placing of the shirt bosom portion and the back portion of the shirt on the buck of the press in a sequence of lays, involving the left front, right front, and back. Each lay required a separate closing and opening of the press for accomplishing the pressing function.

It has previously been suggested that pressing machines be provided for pressing both the front of the bosom and the back of the shirt in a single operation, and pressing machines of this character have been contrived. They have not been entirely successful and are subject to malfunctioning in several respects.

One of the foremost difficulties of such pressing machines heretofore provided is lack of ruggedness and inefficiency of the pressing machine. It is an object of the present invention to provide an improved one-lay shirt-body pressing machine in which these prior difficulties of lack of ruggedness and of inefficiency are overcome. The pressing machines heretofore contrived for the pressing of shirt bosoms and back in a single lay, have lacked ruggedness, with the result that breakage has been frequent and "down-time" inordinately large. It is an object of the present invention to provide an improved single lay in which the functioning of the press is much simplified and the mechanisms accordingly more rugged and less susceptible to breakage. It is another object of the invention to provide an improved pressing machine for pressing a shirt front and back in a single lay, the machine being entirely enclosed during the pressing operation and so guarded as to preclude injury to the operator. It is another object of the invention to provide an improved pressing machine for pressing the front and back of the shirt in a single lay wherein an ironing motion is provided between the presser head and bucks during the pressing operation, for achieving a better finish on the garment. It is a further object of the invention to provide an improved single lay bosom and back press for shirts, said machine being entirely automatic and requiring only the loading and initiation of the operation after which the pressing function is carried out automatically in a sequence of steps by the press. It is a further object to provide an improved pressing machine of the aforesaid character and having much simplified, yet adjustable control mechanism.

Other objects of the invention are those in the apparatus herein illustrated, described and planned.

To the accomplishment of the foregoing and related ends, this invention and discovery then comprises the features hereinafter fully described and particularly pointed out in the claims, the following description setting forth in detail certain illustrative embodiments of the invention and discovery hereof, being indicative, however, of but a few of the various ways in which the principles of the invention and discovery hereof may be employed.

The invention is illustrated with reference to the drawings in which Figure 1 is a perspective view of the pressing machine of the present invention, Figure 1 being a view looking at the machine from a position forward and slightly to the left of the front of the machine. In Figure 1 a shirt is shown on the machine in a position ready to be pressed.

Figure 2 is a vertical transverse sectional view of the pressing machine of the present invention showing it as it would appear with the front portions of the machine framing and covering panels cut away along a vertical plane as at 2—2 in Figure 2. It is understood, however, that this sectional plane is only in respect to those forward portions of the structural framing and certain of the operating elements on the front part of the machine, so as to show the apparatus contained within the housing.

Figure 3 is a sectional view taken along the line and in the direction of arrow 3—3, Figure 2. While the sectional view shown in Figure 3 is generally upright it is not perpendicular, as will be noted from the inclination of section line 3—3, Figure 2.

Figure 4 is a horizontal sectional view taken along the line and in the direction of arrow 4—4 of Figure 2. This figure shows certain of the parts in elevation and others in section.

Figure 5 is a vertical elevational view taken along the line and in the direction of arrow 5—5 of Figure 2, showing the buck structure, from one side (or edge).

Figure 6 is a vertical sectional view through the buck structure taken along the line and in the direction of arrow 6—6 of Figure 5, and illustrates various mechanisms of the buck in the "retracted" or "loading position."

Figure 7 is a view companion to Figure 6 and likewise shows a vertical front sectional view through the buck structure. Figure 7 shows the various mechanisms of the buck in an extended position whereas Figure 6 shows up in a retracted position.

Figure 8 is a horizontal fragmentary sectional view taken along the line and in the direction of arrow 8—8 of Figure 2, except that the hydraulic shock absorber mechanism is removed, so as to simplify the drawing. It will be noted that the section plane, on which Figure 8 is taken is lower down in the machine than that of the companion fragmentary section of Figure 13.

Figure 9 is an enlarged vertical fragmentary front elevational view of the top of the buck's structure having a shirt shown in dotted lines thereon, the shirt being in the position in which it is located when being pressed between the presser heads, the upper portion of the front presser heads being also illustrated in this view.

Figure 10 is an enlarged fragmentary horizontal sectional view through the buck and pressing heads, in their closed position against the buck, as during a pressing operation, Figure 10 being taken in the direction and at the level of arrow 10—10 of Figure 9.

Figure 11 is a fragmentary vertical sectional view taken in a direction looking forward in respect to the pressing machine. The position and direction of the view of Figure 11 is a plane defined by the arrows 11 of Figure 1, this view showing the interior of the cover of the pressing machine and the front movable door panel which protects the operator during the pressing operation.

Figure 12 is an enlarged fragmentary vertical sectional view through a section of the track and movable door portion, and is taken along the line and in the direction of arrows 12—12 of Figure 11.

Figure 13 is a fragmentary horizontal sectional view of the supporting structure for the movable buck, this view being taken along the line and in the direction of arrows 13—13 of Figure 2. The view is a companion to Figure 8 previously mentioned.

Figure 1:
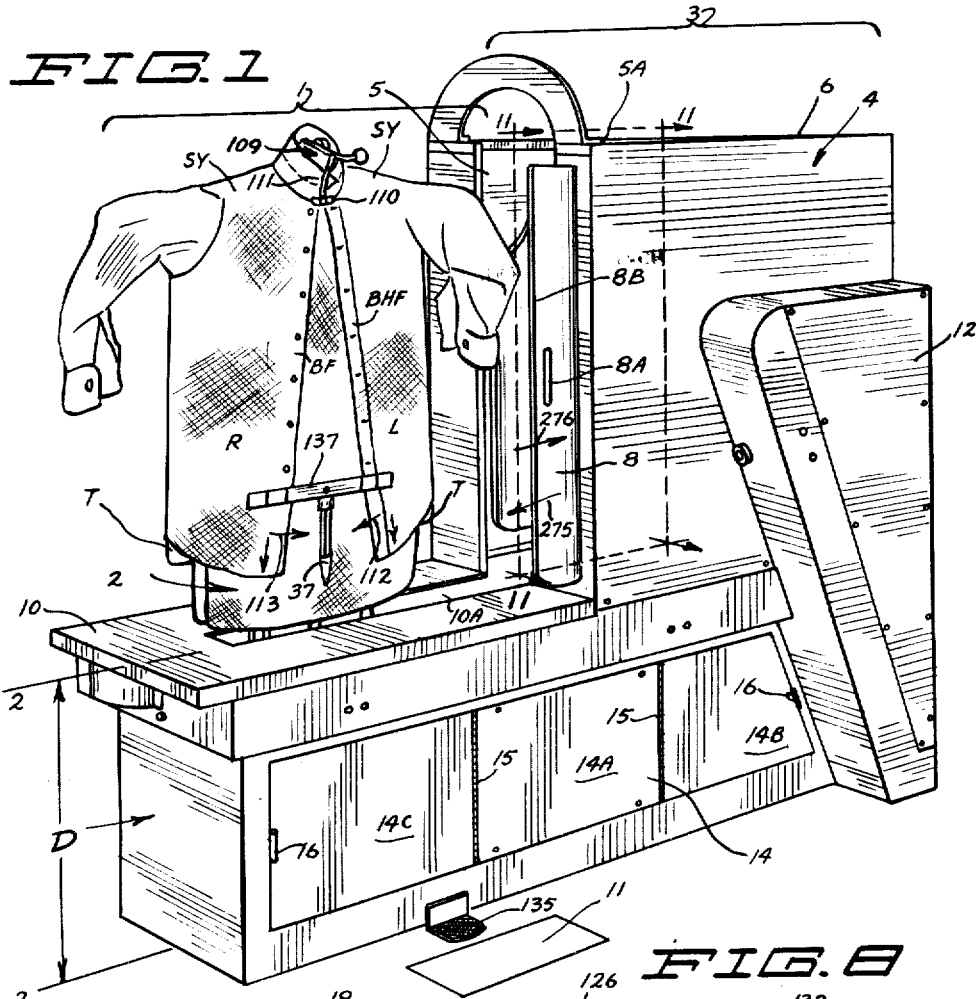

Figures 14, 15 and 16 are fragmentary enlarged views of the upper portion of the buck structure showing the collar clamping arrangement in several positions. Figures 14 and 15 are vertical fore and aft transverse sectional views through the top of the buck, taken along the line and in the direction of arrows 14—14 of Figure 2. Figure 14 shows the collar clamp in the clamping position whereas Figure 15 shows it in a released position. Figure 16 is a front elevational view of the collar clamping device taken along the line and in the direction of arrows 16—16 of Figure 15.

Figure 17 is composed of two sheets, one marked "Figure 17 (upper part)" and the other marked "Figure 17 (lower part)." These should be placed together in these positions and considered as one view. Figure 17 is a schematic illustration of the air controls and circuits of the machine, showing in illustrative manner the various cylinders of the pressing machine together with the controls for operating those cylinders. The various mechanisms operated by the cylinders are not shown as they are elsewhere illustrated in the drawings.

Figure 18 is a fragmentary schematic view companion to that shown in Figure 17, and represents a modified form of control systems. In Figure 17 the timing apparatus is hydraulically controlled, whereas in Figure 18 there is provided an electrical timer.

Figures 19, 20 and 21 are a set of related companion views illustrating details of the mechanisms by which the buck wings and clamping mechanisms are operated. Figure 19 is an isometric view of the main vertical mechanism operating rod of the buck, and the mode of connection to the linkages operated by it. Figure 20 is a front view and Figure 21 a side view of portions only of said main vertical operating rod and linkages moved thereby.

Throughout the drawings corresponding numerals refer to the same parts. Those numerals wherein the lead line is provided with an arrow are for generally designating a part or portion of the machine. Those numerals bearing an alphabetical suffix are related to the same part bearing the same number without a suffix letter.

*General plan.*—Referring to Figure 1, the pressing machine comprises a station shown generally under the bracket 1 at which a shirt may be loaded upon and removed from an upright buck structure generally designated 2, and a cabinet shown generally under the bracket 3 which contains a pressing machine having pressing heads, between which the buck 2 is transported, and the pressing operation carried out. The cabinet structure generally designated 4 is provided with an opening or slot 5 at its left side, at about the center line, the slot continuing at 5A along the upper surface 6 of the cabinet. Accordingly, the buck 2 with the shirt on it moves into the slot 5—5A of the cabinet 4 and locates itself automatically in correct position between opposed presser heads. The cabinet is provided with a safety door at 8 which is movable by means of a handle 8A thereon. The operator pulls the safety door in the direction of the arrow 275 and in so doing protects herself from the buck 2 during its course of movement into the slot 5—5A of the cabinet 4. The movement of the safety door 8 in direction 275 sets in motion the operating mechanisms which then progress automatically through a time sequence, the phases of which may be adjusted, and after the completion of the pressing operation the presser heads are opened, the buck 2 is transported to the position shown in Figure 1, all of the clamps which had previously held the shirt in place are retracted and the pressed shirt may then be removed from the buck 2, the safety door 8 meanwhile being automatically retracted.

It may be noted parenthetically that the pressing of the body of the shirt (which includes the front and the back portions below the yoke and from the sleeve-shoulder seams inwardly) is the last of the pressing operations in the modern shirt pressing sequence. Thus, the shirt pressing sequence in a modern mechanized laundry includes the steps of pressing both cuffs and the collar in a single or several lays on a pressing machine or machines having appropriate buck and presser head structures. The sleeves of the shirt are pressed either individually in a plurality of lays, or on the so-called modern "one-lay sleever" wherein both sleeves of the shirt are dressed onto appropriate bucks and both sleeves are pressed simultaneously in a single operation. In another lay, the upper portion of the shirt, around the collar and at the top of the shirt front and rear panels, commonly called the "yoke" is likewise pressed in a single operation. This, then leaves the shirt with only the body portion not pressed and this complete pressing operation is, by the apparatus of the present invention, carried out in a single lay.

In Figure 1 the loading station under the bracket 1 has a table portion 10 at an elevation D above floor level, such that the vertically disposed and movable buck structure 2 thereon will be at a convenient height for the operator standing at position 11 in front of the machine. The table 10 is provided with a slot at 10A aligned with dimensions corresponding to slot 5—5A, which permits the buck supporting structure to extend upwardly from the carrier mechanism below the table 10 to and at the bottom of the buck 2. The pressing machine cabinet has a protuberance at 12 functionally conforming to framing of the machine. All cabinet portions are in panels attached to interior framing by screws for convenient removal. The front lower portion of the machine is covered by a removable panel 14 in several sections. The center section 14A is held in place by screws and the end sections 14B and 14C are hinged at 15—15 and are provided with door latches at 16—16 by means of which they may be latched in place. This allows convenient access to the mechanism in the lower part of the machine. Similar hinged door cabinet arrangements may be provided at the rear of the machine or any other part thereof for access to the mechanism.

Figure 2:
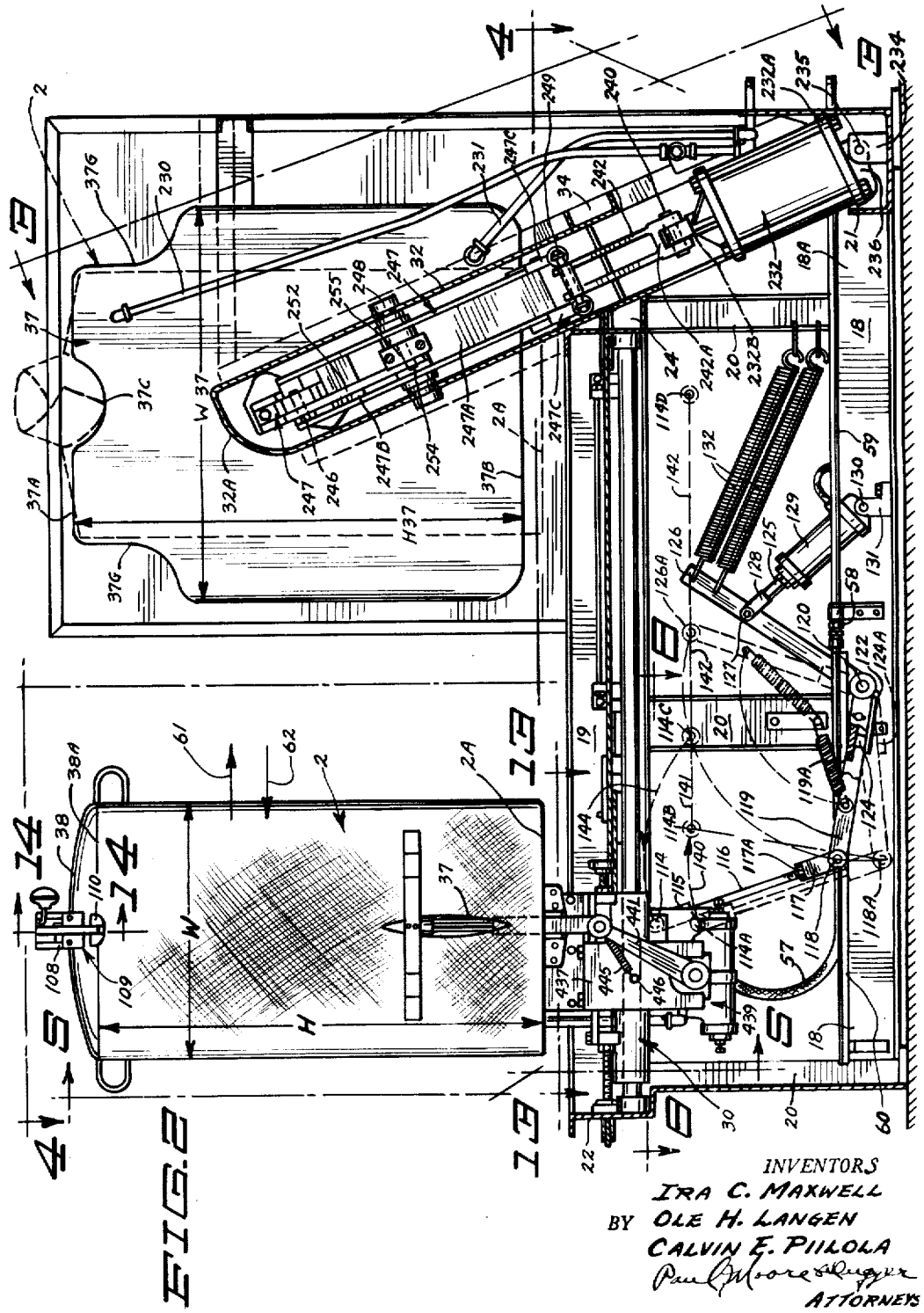

The framing of the machine is best shown in Figures 2, 3 and 4. At the base of the machine are sills of which the rear sill 18 is shown in Figure 2. A similar sill is provided in front. These sills extend from side to side throughout the width dimension of the machine, as viewed in Figures 1, 2 and 4. At the level of the table top 10 and extending downwardly slightly therefrom are a pair of horizontal frame members of which frame 19 is shown in Figure 2. Posts 20—20 at spaced intervals along the machine connect the lower sill 18 and frame members 19 together.

It will be noted that the sill 18 extends at 18A beyond the right post 20, Figure 2 and that a sturdy cross frame member 21 at floor level is provided at the far right side of the machine. Other cross frame members are provided at 22 (at the left in Figure 2) and at 24, above post 20 (at the right in Figure 2). Stretching between the cross frame member 22 at the left and the cross frame member 24 at the right, see Figures 2 and 4, are two heavy horizontal bars 25 and 26. These are preferably round and may be heavy tubes or solid. They are polished and smooth and serve as rails on which the buck supporting carriage generally designated 30 is adapted to be transported back and forth. The heavy rails 25—26, which could be of any desired section, contribute to the stiffness of the machine frame.

At each side and outside of the frame, as defined by the sills 18 and rails 19, there are upwardly slanting frame members 31 and 32, see Figures 2 and 4. These frame members are exceedingly rugged and are slanted at an angle so as to incline generally from the cross frame 21 and thence along side the cross frame 24. An additional cross frame member is provided at 34, see Figure 2. The two frame members 31 and 32 are held in spaced relation at their lower ends by the cross frame member 21 and about midway up the inclined height of the frame members 31 and 32 there are the two cross frame members 24 and 34. In addition, stiffening gussets are provided at 35—35, see Figure 4, which add to the stiffness and rigidity of the framing. Each of the frame members 31 and 32 is of U-shape channel cross section and the upper ends are rounded as at 32A, Figure 2 for pleasing appearance. The upper ends of the members 31 and 32 form a fork (as viewed in Figure 3), which serves to support the two co-operating opposed presser heads generally designated 36 and 37. The thrust between these presser heads is very heavy and this thrust, which is imposed by the driving mechanism of the press, is taken entirely by the fork composed of the two parallel members 31 and 32 which inclines upwardly at the angle shown in Figure 2, cross frame stresses being taken by members 21, 24 and 34, see Figures 2, 3 and 4.

*Buck structure.*—The buck 2, is of generally rectangular vertical plan as viewed from the front, Figure 2, except that at its upper portion there is a rounded surface at 38. With the exception of slots at the side and an elongated hole 37 in the front, the buck is entirely covered with a resilient padding and buck cover and it will be understood that the outline shown in Figure 2 represents the configuration of the buck as viewed with the padding and cover in place. Figure 10 illustrates the internal framing of that portion of the buck below the line 38A. The buck is composed of two halves generally designated 40 and 41, having a curved outer surface 40A flanged inwardly along the vertical lateral edges 40B. Similarly, the buck 41 is curved at 41A and has in-turned flanges at 41B—41B. Within the curves 40A and 41A are built in steam chests formed by means of the plates 42 and 43 which are welded in place at 42A and 43A so as to form the steam chest spaces 44 and 45. The plates 42 and 43 are each provided with appropriate lands as for example at 42B, 42C and 42D, and similar lands at 43B, 43C and 43D. An additional land is provided at 42E and 43E and connector 46 is provided to which pipes for steam supply and condensate return are attached. The two buck portions 40 and 41 are positioned arcuately in respect to each other by corner fastenings. When thus positioned the edges 40B and 41B are spaced apart so as to provide the space 48 at each vertical side edge and within such spaces at each side of the buck there are positioned laterally movable buck wings generally designated 49R and 49L that can be projected in and out in respect to the buck 2, for receiving a portion of the girth of the shirt during the pressing operation. On the buck portion 40 there is provided a padding and cover here collectively designated 50 and similarly on the buck portion 41 there is provided a padding and cover collectively designated 51. The method of fastening these covers is well known and will, therefore, not be specifically described. It can be mentioned that the buck padding is attached to the surface of the buck as to surface 40 or 41 and the cover is pulled over the padding and held tightly around the edges 40B for the buck portion 40 and 41B for the buck portion 41. The wings 49R and 49L are likewise covered with a light padding and cover.

The two buck members 40 and 41 are capped at their upper portion by a frame member generally designated 52, see Figure 5, and the buck padding is carried up smoothly around this frame member which is curved on a carrier surface. As shown in Figure 6 each of the buck members 40 and 41 are provided with internal lands as at 40E—40E and 40F—40F. These permit bolting through to form firm attachments between the buck members 40 and 41 at the corners. In addition, the member 52 is provided with an inwardly extending flange portion at 52A, Figure 5, which underlies the inner surface of the plates forming the members 40 and 41 at their upper edges, thus permitting a firm attachment of the two members 40 and 41 to the member 52 along their upper edges by screws or bolts not illustrated.

The connector 46, see Figures 6 and 10, forms a communicating passage between the two steam chests 44 and 45. Thus, member 46 is provided with tapped ports to receive the incoming steam line 54 and the condensate return line 55. The connector 46 is drilled at 54A and then is provided with a cross drilled hole at 54B which aligns with suitably placed ports of the steam chests 44 and 45. Accordingly, steam under pressure entering through pipe 54 proceeds through the drilled passageway 54A and thence through the passageway 54B into each of the chests 44 and 45, see Figure 10. The condensate from the chests 44 and 45 pass through ports in each chest through the cross drilled passageway 55B and then down through a connecting passageway 55A to the condensate return line 55. The steam line 54 connects with a flexible hose at 56 and the condensate return line 55 connects with a flexible hose 57. The two flexible hoses are curved as shown for hose 57 in Figure 2 and extend back to junctions as at 58, to a pair of lines supplying the steam and returning the condensate at 59, see Figures 2, 5 and 6. A horizontal channel shaped platform of light gauge steel is provided at 60 for supporting the flexible steam and condensate lines as shown in Figure 2. These flexible lines follow the buck 2 as it moves in the direction of arrow 61, towards the pressing position, and in so doing, will curl out of the supporting channel 60. When the buck 2 is moved backward as in the loading position, or in the direction of arrow 62, Figure 2, the flexible steam and condensate lines 56 and 57 are rolled back to horizontal position where they are supported by the channel 60.

Each of the two plates 42 and 43, which serve to form the back wall of the steam chests 44 and 45 of the buck, extends down below the lower edge 2A of the buck 2, as shown in Figure 6, and form the actual mechanical support for the buck. Thus, as shown in Figure 5, these downwardly extending portions 42F and 43F extend down sufficiently so as to embrace the forward and rearward faces of two stout upstanding lugs 61 and 62 which together form a supporting surface against which the portion 42F and 43F of the buck structure may be attached by bolts 63. It will be noted that between the two lugs 61 and 62 there is a space at 65 providing clearance through which an operating rod 66 may move vertically as will be described. The two lugs 61 and 62 are firmly welded to a horizontal plate 67. Against the front under edge of the plate 67 there is bolted a member generally designated 68 having a tubular body portion 68A, within which contains an anti-friction bearing, the bore of which matches the outer diameter of the front supporting rods 25. This bearing may be of the ball race type or may be an anti-friction bushing, or may be composed of appropriately spaced rollers having tires which track upon the rod 25. The form shown allows for a bearing of the ball-race type, which is well known in mechanical arts, but any other suitable types of bearing, allowing translation of the structure 68 back and forth along the rod 25, may be used. Upon the member 68 there are upstanding lugs 68B—68B which are attached by cap screws to the plate 67. Upon the opposed lugs 68B there are mounted stop screws as at 69, having the stop cushion 70 and the adjustment nut 71. The position of the stop cushion 70 with reference to the plates 67 can, therefore, be changed by screwing in the shaft 69 into the lug 68B and locking it in place by means of a nut 71. A similar stop screw and cushion with an identical adjustable mounting is provided at 72, at the right side of the member 68.

Along the back edge of the plate 67, the weight of the plate 68 (and buck 2 thereon) is carried upon the shaft 26 by pairs of spaced rollers 74—74 mounted on a supporting frame 75 from the underside of the plate 67. The peripheries of the rollers 74—74 are spaced apart so as neatly to embrace the diameter of the shaft 26 whereby the rollers and hence plate 67 are accurately positioned in a vertical direction with reference to the rod 26. However, slight misalignment between the two rods 25 and 26 will be accepted by the mounting without binding.

*Movement of the buck.*—Movement of the buck 2 from loading position in the direction of arrow 61, Figure 2, to the pressing position and from the pressing position then back in the direction of arrow 62 to the loading position, is accomplished by a system of pulleys and flexible steel cables, with a fluid actuator as shown in Figure 4. Along the rearmost side frame members 19 there is mounted a hydraulic cylinder generally designated 78, suitably held in place at cylinder end 78A and a cylinder head 78B casting, both of which are formed with flanges positioned for bolting to the channel 19, the cylinder 78 has a piston 79 which is a two-way actuated piston. The outer end of the piston rod has a clevis at 80 threaded thereon, the clevis being adjustably positioned with reference to the rod by means of a locking nut 81. On the clevis is a pivot pin 82 upon which in turn there revolves a wire rope pulley 84. At the left end of the machine, as shown in Figure 4, there is provided another pivot 85 which serves as a mounting for another wire rope pulley 86 and adjacent to the pressing position there is a further pivot 87 which serves as a mounting for the wire rope pulley 88. There are two wire ropes provided. One of these is anchored at 90, Figure 4, adjacent the left end of the machine. This cable anchorage is preferably adjusted by means of an adjustable threaded-end thimble 89 by means of which slack can be taken out. The rope then extends along the path 91, then around one groove of the pulley 84 and then along the parallel path 92, then around pulley 86, thence along the path 94 to an anchorage 95 on the mounting 30 of the buck 2. This anchorage is preferably located directly in line with the center of inertia of buck 2 as at position 95 in Figure 5. The second wire rope has one end fastened to the bracket 96, also by means of the threaded thimble 97, by which slack may be taken up. The wire rope then extends along path 98 and then around a second groove in the pulley 84, then along the path 99 to and around pulley 88 and thence over pulley 88 and along the path 100 to the attachment 101 on buck support 30, directly aligned with mounting 95. By means of hydraulically controlled mechanisms, the piston rod 79 is caused to move backward or forward as desired, in direction of the arrows 102 or 104, Figures 4 and 17. When moving in direction of arrow 102, this lets in the cable 92 which, therefore, permits the mounting 30 of the buck 2 to move in the direction of arrow 62, toward pressing position, the cable 100 meanwhile running around the pulleys 88 and 84 being thus taken in. When the piston rod 79 is moved in the direction of the arrow 104, precisely the reverse happens and the buck 102 is then transported in the direction of arrow 61, toward loading position. The cabling arrangement provides for multiplication in respect to the throw of piston 79 sufficient for transporting the buck 2 from a position shown in full line in Figure 2 to the position generally indicated in dotted lines, and vice versa.

*Neck band and tail band clamps and sleeve supports.*— When a shirt is placed upon the buck for a pressing operation, in accordance with this invention, the button flange BF and the buttonhole flange BHF in Figure 1 are seldom parallel to each other. At the top of the buck 2 there is a collar clamp generally designated 109 in Figures 2, 5 and 6. The clamp is carried upon a frame 108 from the internal structure 38 of the buck 2. The collar clamp 109 includes a clamping plate 110 held by spring strut 111, and this plate in operation pushes against the collar-button and collar-button hole of the shirt, forcing them against the padding of the buck. The shirt is located so that the collar button and collar buttonhole come within the area embraced by the clamping plate 110. Usually the operator of the press will make some indicia mark, such as a light pencil mark in a small elliptical area against which plate 110 hits, and where by practice she has found it most expedient to locate the collar button and collar buttonhole portions of the collar. The shirt is then dressed onto the buck thus located and the clamping plate 110 brought down so as to hold the collar and collar buttonhole portions of the shirt. Then the operator pulls the shirt back downwardly by reaching around the base of the buck on either side with her hands, grasping the tail T of the shirt (at each side and the rear of the buck) and pulling it downwardly and forwardly around the buck. This pulls the shirt yoke along the shoulder SY tightly over the top padding of the buck except that up to this point at least there is nothing to hold the front panels L and R of the shirt in place. The operator then takes hold of the front panels at the bottom of the buttonhole flange BFH and the bottom of the button flange BF and pulls them downwardly and towards each other in the direction of the component arrows generally indicated at 112 and 113. This pulls the shirt back tightly against the back of the buck while also pulling the front panels R and L downwardly tight against the front. There is no collar island as such on the buck, the collar clamp frame 108 being relatively smaller than the area enclosed by the collar band, and somewhat rectangular in general plan as viewed from the top front. Accordingly, the collar band does not fit tightly against the frame 108, there being some space around it inside of the collar band. However, if a collar island shaped to fit a collar is desired, it can be used.

Figure 8:
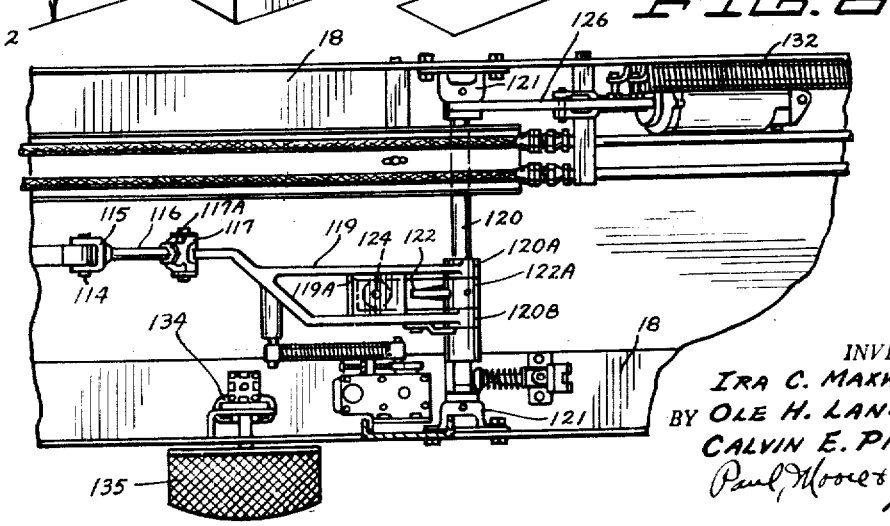

It is a feature of the present invention that all of the clamping arrangements of the buck for holding the tail of the shirt for supporting the sleeves of the shirt during the body pressing operation, and for unclamping the collar band clamp are mechanically actuated to unclamping position at the end of the pressing operation all by a single actuating rod. This is the rod generally designated 66, see Figures 6 and 7. The rod 66 slides in a vertically aligned bearing 112 in the framing of the buck structure. At the lower end of the rod there is provided a pivot pin 114. The vertical motion of the rod 66 is controlled as follows: To the pivot pin 114 there is attached a clevis 115 at the upper end of a drag link 116, the lower end of which is provided with a clevis at 117 attached by the pivot pin 118 to a rocker arm 119 which is pivoted on the shaft 120, but not keyed to that shaft. The length of the drag link 116 plus the clevises 115 and 117 is preferably made adjustable at least one end by screwing clevis 117 on the drag link 116 and locking it in place by the lock nut 117A. It will be noticed from Figure 8, the rocker arm 119 is bifurcated at its lower end and has space bosses 120A and 120B which are drilled to receive the pivot shaft 120 which is in turn pivotally mounted on the sills 18—18 by means of the journals 121—121. However, the rocker arm 119 is free to pivot relative to the shaft 120 but is kept from sliding along it by a smaller lever arm 122, the hub 122A of which is pinned or otherwise attached to the shaft 120. The hub 122A is of just the right width so as to fit between the bosses 120A and 120B of the rocker arm 119. The lever 122 extends from the shaft 120 to the left as shown in Figures 2 and 8 and is provided at its outer end with a stop 124 which may be varied in height relative to the lever. The stop is adapted to engage a cross plate 119A which extends between the bifurcated arms of the rocker arm 119. The stop 124 descends to below the downward position to which the rocker arm 119 may descend under influence of the springs in the buck mechanism. Now the rocker arm 119 is normally urged downwardly by the push of the links 115—117—116 which is in turn attached to the lower end of the buck mechanism actuator rod 66. The rod 66 is normally urged downwardly by the action of a plurality of coil springs within the buck structure 2, see Figures 6 and 7. Therefore, the rocker arm 119 normally wants to move downwardly and it does so until limited by the buck mechanism. At this time the stop 124 is slightly below the position 119A of plate 119A. Stop 124 is on the small lever arm 122 of the shaft 120. However, shaft 120 is movable so as to vary the position of stop 124. Referring to Figures 2 and 8, it will be noted that the shaft 120 has an upwardly and angularly disposed crank 126 which is keyed to shaft 120. Crank 126 has a pivot pin at 127. To the pivot pin 127 there is attached the clevis 128 on the end of a piston rod 125 extending into an air cylinder 129 which is in turn pivotally mounted at its base end at pin 130 on a bracket 131 attached to the sill 18. When the piston rod 125 is all the way in the cylinder 129 (and this occurs when no air pressure is applied to the cylinder 129), the crank 126 is pulled to the full line position shown in Figure 2 by a pair of heavy springs 132, attached to the upper end of the crank and anchored to the post 20. When air under pressure is injected into the cylinder 129, the piston rod 125 is actuated, and pushes the crank 126 so as to rotate shaft 120 counterclockwise, and this allows lever arm 122 with stop 124 on it to be lowered to the position shown in dotted lines at 124A. The stop 124, thus lowered, in effect pulls downwardly away from the plate 119A and in so doing, the rocker arm 119 is then free to move down to its dotted line position shown in Figure 2. This downward movement always occurs due to the downward push of drag link 116 which is in turn urged downwardly by the rod 66 of the buck 2, due to various springs within the buck 2.

The control of air to the cylinder 129 is accomplished by a pedal actuator 135, see Figure 1. The operator when desiring to clamp the already properly smoothed shirt on the buck 2 will place her foot on the pedal 135. This actuates a valve 134, Figure 8, and through a system of controls, this allows air to be injected into the cylinder 129 causing it to move piston rod 125, as previously described, to the dotted positions, Figure 2.

In general it may be stated that when the rod 66 is pushed upwardly, the buck mechanisms are moved to unclamping position and the shirt stretching wings are drawn inwardly into the buck. When rod 66 is permitted to lower, the tail clamp is moved to clamping position and the wings are allowed to go outwardly to stretch the shirt. Thus when lever 119 descends, the rod 66 will also descend, due to the spring action within the buck 2, and this allows all of the instrumentalities within the buck 2 to move to clamp and stretch the shirt preparatory to pressing.

When the buck returns from pressing position, rod 66 is raised. When this occurs the two wings 49R and 49L are retracted to the position shown in Figure 6. The two sleeve supports 136R and 136L are likewise moved to the Figure 6 position, i. e., retracted. At the same time, the upward movement of rod 66 causes the tail clamp 137 to move away from the buck, that is, to the position shown in Figure 5. At the same time, the upper end of the rod 66 engages and releases the collar clamp 109, and the latter having been initially actuated into clamping position when the operator originally placed the shirt on the buck.

When the operator loads a shirt, she will first dress the shirt on the buck, and smooth it a little, and then set the collar clamp 109. She then depresses pedal 135 which allows rod 66 to descend with the clamping and shirt stretching actions previously mentioned.

The lifted position of the rod 66 is that position where the pivot pin 114 is shown in solid line in Figure 2. The lowered position, i. e., 114A, is achieved when the air valve control treadle 135 is depressed as previously described. The operator holds the treadle 135 in the depressed position until the buck 2 has moved a prescribed distance toward the pressing position at which she may raise her foot from the pedal 135, or a delay circuit, not illustrated, may be used to keep the air circuit to cylinder 129 actuated for a certain period after treadle 135 is pushed. Thus, when the pivot pin 114 on the rod 66 is in the position shown a 114A in Figure 2 and the buck 2 is moved as previously described by virtue of the cylinder 78 action, the lower pivot pin 118 of the link 116 will remain in the position shown in dotted lines at 118A. As the buck moves, the pivot pin 114 first tracks along the path as at 140, and as it reaches the position 114B, the path of motion continues along a straight line at 141 to a certain position 114C. In so moving, the link 116 causes the rocker arm 119 to be gradually pulled in a clockwise direction from position 118A to the position shown in full lines in Figure 2 for pivot pin 118, and since it is assumed that the operator still holds the pedal 135 depressed (or cylinder 129 is kept actuated by a timing circuit), the stop 124 will remain in position at 124A. Accordingly, the plate 119A on rocker arm 119 is gradually also pulled away from its lowermost position 124A until at position 114C for the pivot pin 114, the plate 119A is above the most elevated position to which stop 124 will return. Then the pivot pin 114 continues along a straight line path as at 142 to the position at 114D, which represents position of pivot pin 114 when the buck 2 is in the pressing position between the presser heads 36 and 37.

After the shirt is pressed, on the back travel, of the buck 2 in direction of arrow 62, Figure 2, the pivot pin 114 moves from position 114D straight along the line 142, a position in which, as previously, mentioned, plate 119A engages the stop 124, which meanwhile is raised to the full line position of Figure 2. During the pressing operation the operator has removed her foot from the treadle 135 and hence the cylinder 129 is no longer actuated and the spring 132 moves the lever arm 126 to the full line position shown on Figure 2 thus raising the stop 124 to its full line position. Therefore as the buck 2 is moved back toward the loading position, there comes a time when the plate 119A will engage upon the stop 124 and when this occurs the pivot 118 is held in fixed position and pivot pin 114 is caused to move along an arcuate path denoted by the curve 144 and, in so doing, the rod 66 of the buck is raised. This moves all of the movable elements of the buck from the position shown in Figure 7 to the position shown in Figure 6, and unlatches the collar clamp. All this occurs by the time the buck 2 has reached the unloading station shown in full lines in Figures 1 and 2.

*Movable mechanisms and clamps of the buck structure.*—The rod 66 within the buck moves vertically through a plurality of bearing blocks 145, 146 and 147, see Figures 6 and 7. These blocks also serve as stops for various springs, as will be noted. Fastened to the tubular member 68A is bearing 112 for guiding lower portion of rod 66. Along the lower edge of the buck members 40—41 is a bracket 152, which serves as mounting for the lower end of certain of the interval levers of the bucks. These members are best shown in Figures 6, 7 and 20. Referring to Figure 20, the rod 66 is composed of a lower member of circular cross section, and of maximum diameter. This member extends up to about the level of the members 152. Above this level the rod 66 is made of a smaller diameter rod section 66A. The lower portion 66 and the upper portion 66A are connected solidly together by means of a pin at 66B so that the entire rod moves up and down as a unit. On the lower portion of the rod 66 below the block 145 there is mounted on the rod a block 154, which is free to slide up and down on the rod. This block has two oppositely extending pivots 154A and 154B. These pivots serve as a means for pivotally suspending two downwardly extending links 155—155 which are held in place on pivots 154A and B by cotter pins 156—156. As the block 154 moves up and down it will accordingly pull the links 155 up and down.

The up and down movement of the block 154 is controlled by the relative forces of two compression springs 158 and 159. Within the spring 158 and slidable on the rod 60A is a tube 158A, see Figure 20, which serves to determine the minimum length to which the spring 158 can be compressed. Similarly within the spring 159, there is another tube 159A which likewise serves to determine the minimum length to which the spring 159 can be compressed. The spring 158 is more powerful but shorter than the spring 159. It will be noted that the spring 159 rests at its bottom end upon the ledge formed by the upper end of the control rod 66, where it is attached to the smaller diameter portion 66A of the control rod, see Figure 20. The upper end of the spring 159 pushes against the lower surface of the block 154. The spring 158 bottoms against the block 154 and its upper end pushes against the under surface of the bearing block 145 within the buck structure. Accordingly, when the rod 66 is pulled down due to any action, as when the operator depresses the control pedal 135, as previously described, the spring 159 will give way and the more powerful spring 158 will push the block 154 downwardly. In this way, the two links 155 are likewise moved downwardly.

Referring to Figures 19 and 20, the effect of downward movement of the links 155 will be easily discerned. One of the purposes of this downward movement of rod 66 is to move in the tail clamp for the lower portion of the front panels of the shirt from unclamping to clamping position. Referring to Figure 21, upon the mounting 67—75, which supports the buck 2, and travels back and forth on the rods 26—26, there are provided pivot pins 160 to which one end of a toggle link 161 is pivotally attached. The other end of this toggle link has a pivot 162 which pivotally joins it to another toggle link 164. The lower end of the downwardly extending links 155 have a rearwardly extending portion 155A which is also pivotally connected at the pin 162. The forward end of the link 164 is pivotally connected at 165 to the lower end of a tail clamp lever 166, which is pivoted at 167 to a bracket 168 on the buck frame. The upper end of the lever 166 extends out thru the elongated slot 37 of buck 2 (see Figures 1 and 2) and is provided with a pair of tubular extensions 168 (see Figure 21) in which the small rods 169 are adapted to be mounted for up and down movement, for purposes of adjustment. The upper end of the rods 169 has fastened to it the transversely extending tail clamp 137 which is composed of a plurality of light leaf springs laid together, in the manner of a semi-elliptical spring. Accordingly, as the links 155 are driven downwardly, they move the pivot pin 162 along an arcuate path as denoted by the dotted arrow 170, Figures 19 and 21, and in so doing, the toggle is straightened, thereby moving the pivot 165 to its dotted line position (Figure 21) and this swings the lower end of the tail clamp lever 166 outwardly in respect to the front surface of the buck and moves the tail clamp spring 137 toward the padded surface of the buck, for holding the two front panels R and L of the shirt tightly against the buck. The entire upper end of the tail clamp composed of the springs 137 and the rods 169 is made thin enough so that when the pressing head 37 is against the padded surface of the buck, the tail clamp will lie against the padded surface and will not occupy an undue amount of space. When the rod 66—66A moves upwardly as previously described, and the buck returns to the loading position, the lower spring 159 (Figures 6, 7 and 19–21) overpowers the upper spring 158 and causes it to move to the position shown in Figure 6, and in this position the links 155 are drawn up to the full line positions shown in Figure 21, thereby moving the tail clamp outwardly to its full line position as therein shown.

Between the bearing blocks 145—146, in which the intermediate portion of the rod 66 (66A) moves up and down, there is provided a mechanism by means of which the wings of the buck are positively retracted inwardly or moved outwardly under resilient thrust. This mechanism is best shown in Figures 6, 7, 19 and 20. Referring to Figures 6 and 7, it will be observed that the two buck wings 49R and 49L are each mounted by an internal tab; thus the wing 49R has a tab 170 and the wing 49L has a tab 171. Each of these tabs has a downwardly extending notch as at 170A and 171A. For each wing there is provided an upstanding support lever. Thus for the wing 49R there is provided a lever 172 which is pivoted at 174 to the bracket member 152. Similarly, there is provided a lever 175 pivoted at 176 to the bracket members 152. Each one of these levers has an outwardly turned upper tip which carries a pin as at 172A for lever 172 and 175A for lever 175. These upstanding levers carry weight of the wings 49R and 49L respectively, and each wing is free to pivot, within limits, on its mounting pin. Thus, as shown by the double headed arrows 176—176 for the wing 49R, that wing may rock around its pivot 172 so as to adjust its outer edge 177 to the particular slant of the side of the shirt dressed on the buck. Similarly for wing 49L. Each of the levers 172 and 175 has an eye formed between its ends. Thus the lever 172 has an eye at 172B and the lever 175 has an eye at 175B. These eyes are provided with through pivot pins as at 172C and 175C and to these pivot pins there are connected the actuating links by means of which the levers are operated. Thus upon the rod 66—66A there is mounted a block 177, having bifurcated ends, the block being slidable up and down the rod. On the rod 66A there is fastened a collar 178. The slidable block 177 is balanced between two springs, a stronger, shorter, lower spring 179 and a more resilient weaker upper spring 180. The slidable block 177 has pivot pins 181 and 182 to which the upper ends of links 183 and 184, respectively, are attached. These links extend down and have outwardly turned lower ends which pass into the eyes 172B and 175B, respectively. In the eye portion of each of the levers 172 and 175, the links 183 and 184 are pivotally attached at the pivot pins 172C and 175C, respectively. Then, in addition, extending downwardly and outwardly from the lower end of each of the links 183 and 184, there is provided a spring finger as at 185 for link 183 and 186 for the link 184. These spring fingers are shaped so that they reach thru the eyes 172B and 175B and when the mechanism is moved to the position shown in Figure 6, the fingers will contact the inner and lower edge of the wings 149R and 149L, respectively, and balance them to a nearly vertical position. In addition, when the wings are extended outwardly as shown in Figure 7, to their maximum dimension, the tips of the fingers 185 and 186 respectively will hold the wings 149R and 149L in a nearly vertical position. However, even in this position the upper ends of the wings may tip inwardly in the direction of the arrows 187 and 188 to allow such conformance to the shape of the shirt as may be required. In this respect, it will be recalled that the shirt, when on the buck, does not have the front edges, the BF and the BHF, overlying each other, but they are almost invariably in the position shown in Figure 1 and this tends to make the shirt hang in a somewhat frustro-conical form, when considered as an enclosing surface.

The position to which the block 177 is projected downwardly by the spring 180 will depend upon the size of the shirt. When the outer edges of the wings 49R and 49L contact the shirt they will stretch the shirt outwardly. This imposes a sufficient force upon the edges of the wing to hold them from further outward movement and balance the force of spring 80.

When the rod 66—66A is projected upwardly as previously described when the buck returns to the unloading position, the more powerful spring 179 will lift the block 177, and, in so doing, overpower the spring 180. When this occurs the links 183 and 184 are drawn upwardly to the position shown in Figure 6 and this moves all of the mechanism, including the wings 49R—49L, to the "retracted" condition shown in that figure.

Between the bearing blocks 146 and 147 there is provided the mechanism by means of which the sleeve supports are actuated. In this instance, the rod 66A carries the block 190 which is pinned to the rod so that it moves with the rod. The member 190 is of the same configuration as member 177 and has bifurcated ends providing mountings for the pivots 191 and 192 to which downwardly extending links 194 and 195 are attached, the lower ends of the links being pivotally connected at 196 and 197 respectively, to the inwardly extending ends of bell crank levers 198 and 199. These levers are pivoted respectively at 200 and 201. The lever 198 is displaced forwardly in respect to the buck structure, as shown in Figure 6, and is in front of the wing 49L. The pivot 200 is attached to the front buck structure 41. The other bell crank lever 199 is displaced toward the rear of the buck and is behind the right wing 49R and its pivot 201 is mounted on the rear buck structure 41. This is for purposes of clearance. The upper ends of the bell crank levers 198 and 199 are respectively attached to the right sleeve support 136R and the left sleeve support 136L. Each of these sleeve supports is a smooth and polished rod of generally U-shape. They are similar, and one only need therefore be described.

Thus, referring to the bell crank lever 198, it has a pivot 202 at its upper end which is connected to an eye, 204, formed in the downwardly bent end 205 of the rod 136R. The rod then extends along a horizontal path 206 and goes through a guide block at 207 whence it continues outwardly around the bend 208 and extends inwardly at 209. The retracted position of the rod 136R is shown in Figure 6 and its outwardly extending position is shown in Figure 7. The pivot 202 describes an arcuate path around the center 200 and, in so doing, causes the outer tip of the sleeve support rod 136R to move vertically upwardly as the rod is projected. This is due to the fact that toward the end of the stroke the pivot 202 has a slight downward component of movement and the distance between it and the bearings 207 is decreasing. This slight upward and outward movement is an advantage in that it lifts the sleeve slightly and discourages entanglement, as the sleeve is moved to the outer position, as shown in Figure 1. The motion for the left sleeve support rod 136L is precisely the same and need not therefore be described in detail. When the buck is at the loading position, shown in Figure 6, both of the sleeve support rods have been drawn inwardly and the smoothly rounded outer ends of the rods 136R and 136L permit the shirt to be dressed easily and quickly upon the buck. As the operator depresses the pedal 135, this draws the rod 66 (66A) downwardly and the sleeve supports are projected to the Figure 7 position, thereby holding the shirt sleeves, which have already been pressed, in out-of-the-way positions so as not to be engaged by the presser heads during the pressing action.

The collar clamp, generally designated 109, has been previously referred to and will now be described in detail. Referring to Figures 2, 14, 15 and 16, the collar clamp, 109, is mounted upon the upper framework 52 of the buck structure. The frame 52 has a hollowed out space 52A into which the upper end of the rod 66 may project. At the sides of this space there are a pair of upstanding ears 108, which serve as a mounting for the pivot pin 210. The collar clamp mechanism operates on the pivot pin 110 and consists of a generally triangular piece 211 having a forwardly and outwardly extending handle 212 terminating at the knob 214. The generally triangular surface has an arcuate front surface 211A, generally radial rearwardly extending surfaces 211B and 211C which are smoothly joined by the radius line 211D. This member has a pivot at 215 to which a rearwardly and downwardly extending toggle link 216 is pivotally attached. The toggle has a pivot 217 at about the middle of link 216, and the latter has a foot at 218 which, in the position shown in Figure 14, may be engaged by the upper end of the rod 66A when the latter is elevated. On the pivot 217 there is pivotally attached the rearwardly end of another toggle link 219 which is pivotally attached at 220 to the frame pieces 108—108. A roller 223 is also provided on the pin 217. Also journaled on the pivot 210 is a locking member 221. The member 221 is journaled on the pin 210 at its hub 221A, but it is also provided with an enlarged bore at 221B to receive a torsion spring 222. The bore 221B has a downwardly opening portion at 221C against which one end 222A of the torsion spring is adapted to engage. The other end, 222B, extends downward and to the side and is anchored to one of the frame pieces 108. The torsion spring 222 is made so that it applies a rotating force in the direction of arrow 224, see Figures 14 and 15. The member 221 has a rearwardly and downwardly extending arm 225 which has an arcuate notch 226 in line with a roller 223 on pin 217. The member 221 also has a forwardly extending lever portion 227 to which a downwardly extending spring 111 is attached. The spring has a curled end forming a pivot, to which the collar engaging foot 110 is pivoted by pin 229.

The operation of the collar clamp 109 is as follows: When, in the unclamped position, Figure 15, the operator arranges the shirt on the buck and moves the collar button and collar buttonhole portions into proximity where she knows by previous experience they can be engaged by the collar clamp foot 110 when the latter is pulled down. Usually the operator will make a small mark on the padding of the buck so as to assist in locating these portions of the shirt. The operator then pulls downwardly on the lever 214. This causes the member 211 to be rotated. As the member 211 is rotated it moves the pivot pin 215 arcuately, in a clockwise direction, as shown in Figures 14 and 15. This causes the link 216 to be pushed downwardly and backwardly, and this also carries the pivot pin 217 and the roller 223 thereon. The roller 223 engages the under surface of portion 225 of the member 221 which is normally urged in a counter-clockwise direction of rotation by the torsion spring 222. This action overpowers the spring and causes the member 221 to be rotated in a clockwise direction. Meanwhile, the toggle composed of the links 216 and 219 is being moved from the position shown in Figure 15 toward the position shown in Figure 14. As the toggle reaches the position shown in Figure 14, the roller 223 on the pivot pin 217 is moved out towards the outer end of portion 225 where it engages the notch 226 and rests in the notch. Meanwhile, the portion 227 of the member 221 has been rotated arcuately down towards the shirt until foot 110 engages the shirt and pushes it tightly against the padding of the buck. The spring 111 affords sufficient flexibility in the motion so as to permit the roller 223 to find the notch 226 and lock therein. The operator has meanwhile dressed the shirt on the buck and rod 66 is in the Figure 2 position. The collar clamp will stay in this position thereafter, but if the handle 214 is manually moved from the position shown in Figure 14 towards the position shown in Figure 15, the backward motion will withdraw the roller 223 from the notch 226. Normally, however, the operator will clamp the collar and it will stay clamped until the machine automatically unclamps it at the end of the pressing operation. This automatic unclamping is accomplished by the upward movement of the rod 66 at the end of the buck travel towards the loading position. When this occurs, the upper end of the rod 66A engages the foot 218 on lever 216 and kicks it upwardly, thereby causing the roller 223 to be forced out of the notch 226. When this occurs the mechanism is free to snap back from the position shown in Figure 14 to the position shown in 15 under the influence of the torsion spring 222.

It might be supposed that the top of rod 66 would prevent the foot 218 of lever 216 (collar clamp 109) from descending far enough to lock, when the buck is in the loading position (Figure 2), but a careful examination of the mechanism will reveal the action as follows: Please refer to Figure 2. When the buck 2 is on the return travel toward (but has not yet reached) loading position (Figure 2) pivot pin 118 is held elevated, as already explained. This causes drag link 116 to swing as a radius around pivot pin 118 as a centre, and pivot pin 114 follows the arcuate path 144 (Figure 2). The pivot pin 114 reaches its highest point on this path 144 a short distance before buck 2 has reached loading position and in so doing pushes rod 66 to its most elevated position, thereby kicking foot 218 of the collar clamp 109 to allow it to snap to "open" position. However, then as buck 2 moves home to "loading" position, pivot pin 114 (and hence also rod 66) draw down a little, and hence away from the position of foot 218, when it is in the position of Figure 14. This allows the necessary clearance, when later the operator again sets collar clamp 109 to the Figure 14 position, on the next shirt. Hence it may be said that the collar clamp 109 is kicked to "open" position as the buck 2 is returning toward its "loading" position, of Figure 2, but when finally in such position the collar clamp may again be reset to "clamping" position (Figure 14) without interference of foot 218 with the upper end of rod 66.

*Presser heads and their operating mechanisms.*—These elements, in relation to the buck, will now be described. These portions of the machine are best shown in Figures 1, 2, 3, 9, 10 and 11 of the drawings.

As will be observed in Figures 1 and 2, the buck generally designated 2 stands upright. The central portion of the buck has a width W, which in cross section is like a flattened ellipse, as shown in Figure 10. The height of the buck from the line 38A to the line 2A is indicated by the dimension H, in Figure 2. Then, in addition, the two wings 49R and 49L extend out thru the slots 48—48, see Figure 10, to a maximum projection as shown in Figure 7. These wings are thin sheets of metal covered with a light padding and with a tough cover of nylon fabric or the like, that is suitably fastened in place. The presser heads are shaped to conform to the shape of the buck, including the projecting wings. The presser heads 36 and 37 are formed so as to co-operate with the buck and are shaped as follows:

The central portion of the presser heads conforms to the buck in respect to transverse cross sectional shaping. Referring to Figure 2, the height H of the front presser head 37, which is shown at the front of the machine in this view, begins at the line 37A, which is slightly higher than the line 38A of the buck structure. The central portion of the presser head 37 then extends down through the dimension 37H and stops at the line 37B, which as will be noted, is slightly above the line 2A which is the bottom of the buck. The two presser heads, 36 and 37, are identical in vertical side elevational shape except that the front presser head 37 has a downwardly and smoothly curved notch at 37C to avoid the collar of the shirt, and the collar clamp mechanism 109. The rear presser head 37 is straight across the top, at the level of the line 37A, of Figure 2.

Referring to Figure 10, which shows the presser head 36 and 37 in contact with the buck, it will be noted that throughout the width dimension W the shape of the center portion of the presser heads conforms to the shape of the composite buck structure 2 except that upon reaching the slot space 48 the presser heads are smoothly curved as at 37E—37E and 36E—36E. Then each of the presser heads exends out flat and level to the full width W—37. The thus formed flat extensions 37W—37W and 36W—36W conform to the flat front and rear vertical surfaces of the wings 49R and 49L, and overlap the greatest extension of those wings, plus a little extra. The entire interior surfaces of the presser heads are smoothly finished, plated and polished, chrome plating being preferred because it provides an extremely hard, smooth, shiny, wear-resistant surface that is not easily scratched by buttons or any metallic objects which might come in contact with it.

When the shirt is placed on the buck, clamped in place, and the wings 49R and 49L extended, as shown in Figure 1, the girth of the shirt is drawn tightly and will follow the lines, as in Figure 10, beginning at S1, then around right edge S2 of wing 49R, thence along line S3, thence along line S4 which conforms with the smoothly curved exterior surface of the padding on the rear buck 2, thence along the line S5 around the edge S6 of the left wing 49L, thence along the line S7 and into contact with the padding of the front portion of the buck, and thence along curved line S8 to close along the line S1. As the presser heads 36 and 37 advance toward buck 2 during the closing movement, the portions 36E—36E of the rear presser head and 37E—37E of the front presser head will come into contact with the taut span of the shirt which is otherwise unsupported at S1, S3, S5 and S7, and will force these portions of the shirt into conformity with the buck 2 and the wings 49R and 49L, achieving finally the position shown in full lines in Figure 10. The initial reaction is to increase the tension on the girth of the shirt and this may slightly draw in the wings 49R and 49L, against the resilient action of the spring 180, see Figures 6 and 7. This is an advantage inasmuch as it produces a slight drawing of the fabric on the head surface thus achieving an ironing action caused by the slight rubbing action of the fabric against the smooth polished interior surfaces of the presser heads. This gives a better "finish." It will be noted from Figure 10 that the entire circumference of the shirt, as viewed in transverse plan, is contacted by the smooth and polished interior surfaces of the presser heads, with the exception of the narrow portions S2 and S6, and that all portions of the fabric of the shirt are compressed between the padding and the presser head except for those slight curved areas S2 and S6, and at 36E—36E and 37E—37E, and of these, the latter as previously mentioned, are longest in contact with the heated presser heads and are given a slight ironing effect as the presser heads close. In this manner, an exceedingly good finish is obtained entirely around the shirt girth.

As shown in Figure 2, the presser heads 36 and 37 are both cut out at the portions overlapping the structure of the sleeves with the yoke of the shirt, these cutouts being indicated at 37G—37G for presser head 37. The side elevational view of the presser head 36 is the same. The line 37G will extend slightly onto the sleeve beyond the normal sleeve-yoke seam of the largest shirt. It will be noted from Figure 9 that the upper corners of the wings 49R and 49L project into the upper portion of the corresponding sleeves of the shirt. It should be remembered that, as shown in Figure 9, the projecting sleeve supports 136R and 136L reach well into the sleeve, this being also depicted in Figure 1. Accordingly, the pressing action of the buck and heads extends slightly onto the upper portion of the sleeve and thus overlaps the finished areas previously done on the sleeve presses, or press, on which the sleeves of the shirt were previously finished.

While not shown in Figure 10, it will be understood that each of the presser heads 36 and 37 is provided with an adequate chamber into which steam under pressure can be introduced. The piping is shown in Figure 2, a steam line being provided at 230 which connects with the upper portion of the chest and a condensate return line at 231. Similar lines are provided for the presser head 36. These steam and condensate lines are of wire braid reinforced flexible hoses, so as to allow necessary movement of the presser heads without deterioration of the lines.

The mechanism for moving the presser heads together is shown best in Figures 2 and 3. It consists of a heavy large diameter air cylinder, generally designated 232. Upon the bottom frame member 21 there is a heavy pivot bracket 234 supporting pivot pin 235. The pivot pin passes through a projection 236 on the head of cylinder 232. Within the cylinder is a heavy piston connected to the piston rod 232B which has a cross piece 237 attached to it and held in place by the nut 238. The cross piece carries the pivot pins 239 and 240 to which pairs of toggle links 241 and 242 (see Figure 2) are pivotally connected. Each pair of toggle links extends upwardly and at the upper end is pivotally connected to one of the support arms which carry the presser heads. Since these are identical for each head, only one side will be described.

Thus, referring to the presser head 37, on its rear side there is a stout pad 37H which serves as a mounting for the pivot bracket generally designated 244. The pivot block 244 serves as a mounting for two pivot pins 245 and 246. The pivot pin 245 pivotally connects to a heavy lever arm, generally designated 247, which is journaled on another pivot 248 that is carried in the frame member 32. By referring to Figure 2 it will be noted that the heavy lever 247 is made in two sides that are held together by a central reinforcing web 247A at its lower end and by another central reinforcing web 247B at its upper end. The lower end of the lever 247 thus provides a bifurcated portion 247C through which a pivot pin 249 is carried. This pivot pin serves as the connection for the upper end of the pair of links 242, previously mentioned. It will also be noted from Figure 2 that the pair of links 242 are connected by their own web, 242A. The lever 247 is movable from the full line to the dotted line position shown in Figure 3 and moves the presser head 37 backward and forwards from the full line to the dotted line position as indicated by the arrows 250 and 251. In order to prevent tipping of the presser head 37, there is provided a second link 252 which has its upper end connected to the pivot 246 on the structure of presser head 37 and has its lower end connected to a pivot 254 that is mounted in a bracket 255 in the frame member 32. The link 252 is situated between the two spaced pieces which make up the lever generally designated 247, this being illustrated in Figure 2. Clearance is provided in this way. Accordingly, when the lever 247 moves from the full to the dotted line position of Figure 3, the link 252 likewise moves from its full to its dotted line position and always maintains the presser head 37 in a plane parallel to its first position.

It will be noted however, that as the presser head 37 moves from the full to the dotted line position, there is a slight downward component of motion and this downward component of motion continues even after the presser head has come initially into contact with the surface of the shirt on the uncompressed material of the buck padding. It will be remembered that the ordinary buck padding consists of a lower layer of springy material covered by a suitable pad and that this is, in turn, covered by a tough fabric such as nylon cloth. The shirt when dressed onto the buck will not compress the padding, but as the presser head enters into the contact with the surface of the shirt the padding will gradually be compressed and will "settle," thus allowing the presser head on each side of the buck to move a little further towards the buck framing and this final movement applies final finishing pressure. Since this final movement is in the same direction as the free closing movement of the presser head toward the buck, it produces a slight ironing effect against the shirt even after pressure has been applied. This is an advantage since it produces a fine finish on the shirt.

The lever arms for mounting the presser head 36 are identical with those for mounting the presser head 37 and will not be described except to note that the main lever is shown generally at 256, the supplemental lever at 257, and that these are connected to be operated by the linkage 241. The two links 241 and 242, connected through the bracket 237 on the piston rods and co-operating with the lower ends of the two levers 247 and 256, form a toggle which permits the application of extreme pressure for the final pressing operation. Each of the links 241 and 242 is provided with an extending pin, as at 258 for the lever 241 and 259 for the lever 242. These pins extend to the front and to the back of each lever, as shown in Figure 2, and between the projecting ends of the pins for each lever there is connected a pair of heavy springs 260 which serve to apply the necessary biasing force by means of which the linkage is restored from the dotted line to the full line position shown in Figure 3, for opening the press.

*Safety door and control mechanism.*—Referring to Figures 1, 11, 12 and 17, there is illustrated the construction of the safety door 8 and the manner in which it is mounted and retracted. In Figure 1 the safety door 8 is shown in the "open" or "unguarding" condition. This door is a flat panel having an inwardly curved front edge 8B and has a handle, 8A, by means of which the operator can move it in the direction of arrow 275, from the "open" position shown in Figure 1 to the "guarding" position shown in Figure 11. The door is supported upon a pair of drawer rails, generally designated 262 and 263. These drawer rails are standard items of manufacture and consist of an outer channel 264 having trackways 265 and 266 rolled longitudinally thereof. Thence there is also an inner channel 266 having corresponding trackways 267 and 268. In the trackways there are adapted to roll a plurality of ball bearings 269 and 270, which are held in a ball bearing race frame 271. The outer trackway 264 is attached by rivets or bolts 272 to the outer panel 4 which covers the pressing machine, see Figure 1. The inner trackway 266 is likewise riveted or bolted at 274 to the door 8. The trackways are disposed in parallel condition, as shown in Figure 11, and the door thus mounted may easily be moved in the direction of arrow 275, to the "guarding" position shown in Figure 11 and it is retracted automatically in the direction of arrow 276 by an air mechanism. On the inner surface of the door there is provided a bracket 277 carrying a rubber bumper 278 which is adapted to strike the front framing 280 of the press structure and limit the movement of the door. The door is moved manually in the direction of arrow 275. On the front frame rail 19 of the press there is mounted a pivot block 281 having a pivot pin 282 on which a lever 283 is adapted to swing. The upper end of the lever has a pin 284 which extends into the vertical slot 285 in the door 8 and consequently, as the lever is moved in the direction of arrow 286, it will move down in the slot 285 and as the lever moves in the direction of arrow 287, it will move up in the slot. The lower end of the lever is connected by means of the pivot pin 289 to the clevised end 290 on the piston rod 291 that operates in cylinder 292, the cylinder base 294 of the cylinder being pivotally connected at 295 to the frame member 19. The cylinder has an inlet line 419. When air under pressure is introduced into the inlet 419 the piston rod 291 is projected and this causes the lever arm 283 to move in the direction of arrow 287, thereby moving the door 8 in the direction of arrow 276 from the "guarding" position to the "open" position. The piston rod 291 is simply moved manually to the position shown in Figure 11 as the operator draws the door 8 in the direction of arrow 275 to the "guarding" position, and this sets piston rod 291 to the Figure 11 position. Upon the frame member 280 of the press there is mounted an air valve 299 having an inlet line 410 and an outlet line 411. The valve 299 has an actuating stem 305 which is normally pushed upwardly, as shown in Figure 11, by the spring 306. At the upper end of the stem there is an actuating plate 307 having a downwardly turned end 308. The valve is mounted so that the actuating plate 307 is close to the inner surface of the door 8 and positioned so that it can be engaged by a roller 309 that is pivoted on a journal carried by the inner surface of the door 8. When the door is in the "open" position, the roller will be in its dotted line position shown in Figure 11. When the operator desires to initiate operation of the press, the door is pulled manually from the position shown in Figure 1 to the position shown in Figure 11, and in so doing, the roller 309 moves along a path of travel in the direction of arrow 310 until it engages the downturned end 308 of the actuating pad 307 of the valve. When the door 8 is in the "open" position, this actuating pad is in the dotted line position shown in Figure 11, and the roller 309, engaging the downturned end 308, will cause the pad 307 to be moved downwardly to the full line position shown in Figure 11, thereby pushing the stem 305 of the valve down against the action of spring 306. When the valve is in the "up" position, the air circuit between lines 410 and 411 is closed, but when the stem 305 is pushed down, air can flow from line 410 to line 411 for initiating the action of the pressing sequence.

*Air circuits.*—The circuit diagram, Figure 17, illustrates schematically the various components of the machine and their circuit connections. In this diagram the buck mechanism operating cylinder 129, the buck travel cylinder 78, the presser heads operating cylinder 232, and the guard door return cylinder 292 are illustrated. In addition to these, the air circuits include a pilot operated valve mechanism, generally designated 315. This valve is a standard item of manufacture and includes a piston 316, which operates the valve stem 317 from the full line to the dotted line positions shown in Figure 17. The valve 315 has an inlet port 318 for air under pressure, an exhaust port 319 which exhausts through the muffler 320 to atmosphere. Additional ports are provided at 321, 322 and 324. The valve also has a port at 325 into which air is injected for operating the piston 316. When no pressure is applied to the port 325, the piston 316 will remain in the full line position under the influence of the spring not illustrated, within the valve casing. When in this position, the port 322 will be connected directly to the port 321 for exhausting the line 431. Also, air under pressure is communicated from the air inlet port 318 to port 324. When air under pressure is introduced through control port 325, the piston 316 is moved to the dotted line position, thereby actuating the valving arrangement within the valve 315. When this occurs, the circuit which had previously been opened between port 322 and port 321 is closed and the circuit previously opened between 318 and 324 is likewise closed. With piston 316 operated to the dotted line position, communication is established from the air inlet port 318 to the port 322 and exhausting is established between ports 319 and 324. The valve 315 has only two operating positions.

At 326 there is generally shown another pilot operated valve. This valve has a pilot cylinder inlet port 327, through which air under pressure may be introduced against the piston 328. The piston 328 is normally held (upward, in Figure 17) in the full line position due to the action of the spring 329 and, when in this position, the exhaust port 330 is opened to side port 342 through the channel 331 and through a channel 332 in the stem of the valve attached to the piston 328 to a valve port at 334 in the end of the stem of the valve. Below the stem 333 of the valve, there is a cone-shaped tip 335 on the valve 336 which will seat against and close valve port 334. At the lower end of the valve 336 there is a conical enlargement at 337, seating in the valve seat 338, which opens into the antrim 339 connected to the port 340. The valve 336 is normally held (upward) in the position shown in Figure 17 by means of a spring 341 or air pressure. A side port is provided at 342. In the casing of the valve there is a channel 344 and 345 connected therewith, which communicates with a port 346 which is normally below the position of the piston 328 when no air pressure is standing against that piston, and it is consequently raised by the spring 329. Channel 344 is plugged at 344A. When piston 328 is operated (i. e., pushed downwardly by air pressure on its upper surface) its piston ring will be below the port 346 and air under pressure, entering through the channel 344, will be communicated via channels 344, 345 and port 346 to the upper face of the piston 328, and will maintain it in the operated (down) position connecting ports 340 and 342, closing exhaust port 330.

Shown generally under the bracket 348 is a timer valve. This valve has an operating shaft 349 which is arranged to be moved by a lever 350. The lever ordinarily is pulled back against a stop screw 351, which is adjustable. The lever is pulled (clockwise rotation) against the screw 351 by means a spring 352, which is connected to a pin 354 on the lever 119, which, as it will be recalled, is attached to the buck mechanisms, and follows the buck in its travel to the pressing position (see Figure 2). When the buck travels to the pressing position, the lever 119 will be pulled around to the dotted line position, as shown in Figure 17, and the pin 354 will follow an arc of travel shown in dotted lines at 355. In so doing, it moves around to the right side of the lever 350, as depicted in dotted lines in Figure 17, and when this occurs, the action of spring 352 will be reversed and, whereas it first pulled lever 350 toward stop screw 351, it will now cause the lever 350 to be drawn (counterclockwise rotation), hence away from the stop screw 351. The motion of the lever 350 will not be rapid because the shaft 349 has on it another lever 356 which is connected by a link 357 to a piston 358 in an oil dash pot 359. The dash pot is a closed cylinder and has a circulating line 360 connecting its ends above and below the piston 358. The line has an adjustable needle valve at 361 in it and consequently the rate of travel of the piston 358 can be regulated; hence the rate at which the shaft 349 is turned (counterclockwise) may be regulated as desired. The lever 356 has on it two pins 362 and 364. The pin 362 ordinarily rests against the top of the stem of valve 365 and normally holds that valve in an open position, allowing air to pass from supply line 366 to line 367. The symbol "NO" indicates that this valve is "normally open" when timer 348 is not operating. The pin 364 is arranged so that as the arm 356 travels counter-clockwise as shown in Figure 17, it will, after a certain predetermined time interval (which is adjustable at 361), enter into engagement with the upper end of the valve stem 368, thereby depressing it, the valve stem being normally held up by the spring shown. The valve stem 368 is a part of the valve 369 and when the stem is up, which is the normal position, the valve 369 closes off communication between the exhaust port and muffler 370 and the line 371, but when the valve stem 368 is depressed by the action of pin 364, the line 371 is put into communication through the valve to the exhaust 370.

The rocker arm 119 on shaft 120, operated by cylinder 129 and lever 126, which it will be recalled is in conjunction with the operation of the movable buck wings, clamps, etc., carries on it an adjustable stop screw 372 which is arranged to move against and operate the stem 374 of the valve 375. This valve has a port 376 connected to the line 377 and another port 378 connected to the line 379. When the lever 119 connected by rod 116 follows buck 2 in between presser heads, stop screw 372 holds valve 375 in operated condition during which line 377 is in communication with line 379.

The presser head operating cylinder 232 is provided with short large pipe 380 leading to a quick exhaust valve, generally designated 381. This valve is provided with a port 382 leading into the space 383 in which there is situated a diaphragm valve element 384, composed of flexible rubber. This diaphragm is centered by a plurality of flutes around the inside of the space 383 so that air can flow around the edge of the diaphragm. The central portion of the diaphragm seats against the valve port 386, which connects to the exhaust line 387 and exhaust muffler 388. The air flow around the edge of the diaphragm 384 extends through the passage 389 to the pipe 390, which is connected to a flow regulator valve 391, which is in turn connected to line 379. The line 377 from valve 375 (under bracket 348) connects to port 342 of pilot valve 326.

Cylinder 129 has an inlet-outlet port at 392 which connects through line 394 to junction 395, from which a circuit extends at 396 to a valve 397. The valve 397 is a three-way valve and has ports 398 and 399. It has a stem 400 which is normally pressed downwardly by a spring 401. When the foot pedal 135 is operated, the spring 401 is compressed and the stem 400 is moved upwardly. When this occurs, communication is established between port 398 to port 402 and thence to line 396. When the operator removes her foot from the treadle 135, the valve again returns to normal position and port 398 is closed off and ports 402 and 399 are connected together, allowing line 396 to exhaust to line 404 and thence through a flow regulator valve 405 and through the exhaust muffler 406 to atmosphere.

From junction 395 a circuit extends via line 407 and thence through a check valve 408, which permits flow in the direction of arrow 409 but stops it in the opposite direction, and thence via line 410 to the door valve 299, previously mentioned. When the valve 299 is operated by the pin 309, and hence the stem of the valve is depressed downwardly, flow will be established from line 410 to line 411 and thence to junction 412, which is connected to line 371. Junction 412 is also connected via line 414 to junction 415, which connects via line 416 to port 327 of valve 326. From junction 415 a line 417 extends through the flow regulator valve 418 to port 325 of valve 315 previously mentioned.

From port 419 of cylinder 292 (which retracts the door 8 to the "open" condition at the end of the pressing cycle), a circuit extends via line 420 through a flow regulator valve 421 to junction 422. From junction 422 a circuit extends via line 424 and the flow regulator valve 425 to atmosphere through the exhaust muffler 426. Likewise, from junction 422 a circuit extends via line 426 to port 321 on the valve 315.

From port 322 on the valve 315, a circuit extends via line 427 to the junction 428, whence a circuit extends at 429 to the port 340 on the pilot valve 326. Also, from the junction 428, a circuit extends through the flow regulator valve 430 and line 431 to the port 432 of cylinder 78. When air under pressure is introduced through port 432 into cylinder 78, the piston rod 79 will be pushed in the direction of arrow 102 which causes the buck to be drawn from the loading position into the space between the presser heads. The cylinder 78 also has another port at 434 which is connected via line 435 to a flow regulator valve 436 which is, in turn, connected to the port 324 of the pilot valve 315. When air under pressure is introduced into port 434 of cylinder 78, the piston rod 79 will be moved in the direction of arrow 104, and this causes the buck to be withdrawn from its position between the presser heads to the loading position shown in Figure 1. All of the air rate-of-flow regulating valves 391, 405, 418, 421, 425, 430 and 436 have adjustments by means of which the rate-of-air flow thru them may be regulated for timing the various functions of the pressing sequence. These valves are constructed so as to have the metering rate adjustable in the direction of the arrow "M," shown on each valve. The reverse flow thru valves 438 and 430 is unimpeded. The remainder of the rate valves can be simple needle valves.

*Shock absorber assembly and auxiliary mechanisms.*—
The movement of the buck 2 from the loading position shown in Figures 1 and 2, to the pressing position between the presser heads 36 and 37, is accomplished by the piston-cylinder arrangement 78. In order to slow down the movement of the buck at each end of the stroke of the piston, there is provided a hydraulic shock absorber mechanism, as follows: Referring to Figures 2, 4, 5, 6 and 13, it will be observed that upon the front of the carriage 30 (which carries buck 2), there is fastened an L-shaped mounting plate 437, which is held firmly in place by the cap screws 438. Upon the back of the downwardly extending portion of the mounting plate 437, there is mounted a hydraulic shock absorber, generally designated 439, having an operating shaft at 440. Upon the shaft there is an upwardly extending lever 441, having a roller 442 extending forwardly on the pivot shaft 444. On the back end of the pivot shaft 444 there is a pin upon which the upper end of a coil spring 445 is attached, the lower end of the spring being anchored to a centrally located pin 446 on the plate 437. The effect of the spring is normally to bias the lever 441 of the hydraulic shock absorber to a vertical position. At each end of the stroke of the buck 2, there is an appropriately positioned bumper plate located so as to be engaged by the roller 442, as the mounting plate 30, with the buck 2 thereon, approaches the final end position. Thus, referring to Figure 4, it will be noted that adjacent the loading position, there is provided a bumper 449 which is mounted upon the frame 19. Similarly, there is another bumper 450 at the opposite end of the stroke, adjacent the pressing position of the buck 2. Each of these bumpers is mounted on a short length of angle iron welded in place, and is provided with a smooth pad on its surface for engagement of the roller 442 thereon. Therefore, as the buck carriage plate 30 moves toward either end of its stroke, the roller 442 will engage either the bumper 449 or the bumper 450 and the lever arm 441 will be rotated about its pivot 440 as the buck carriage 30 continues to be driven home to its stopping position. This movement of the lever 441 from the central position actuates the hydraulic mechanism within the shock absorber 449 and gradually slows down the movement of the buck as it approaches final position. The final position is, of course, accurately determined by the adjustable stops 70 and 67.

The same plate 437, which serves to mount the hydraulic shock absorber 439, is used for mounting a bearing assistance plate 451, see Figure 5. This plate is held by the same through bolts which hold the shock absorber 439 and has two vertical surfaces 451A and 451B. These are connected together across the top so that a space between them is provided for movement of the drag link 116, which actuates the movable buck mechanisms. The reason for plate 451 is that it assists in steadying the lower end of the actuating rod 66 (which moves the buck mechanisms, see Figure 6). At the lower end of the rod 66 there is a pivot pin 114, by means of which the upper end of the drag link 116 is pivotally connected to the rod 66. The downwardly extending portion of the rod 66 also carries a bracket 452, which serves as a perch for a spring 453 that helps push the rod 66 downwardly. The lower end of the rod 66 is rather long and extends considerably below its lower-most bearing. Accordingly, to steady it, there is provided a plate 451 which is shown in dotted lines in Figure 6. On each end of the pivot pin 114 there are provided rollers 455 and 456 which roll against the left vertical face of the plate 451, as shown in Figure 6.

*Operation.*—It will be assumed that the buck 2 has been moved, by virtue of a previous operation, to the loading position shown in Figure 1. It is also assumed that air is applied under pressure to the port 318 of the 4-way valve 315 and to the port 366 of valve 365 of the timer 348. Of course, external shut-off valves are customarily provided in all air lines for shutting down the machine, but for purposes of this explanation, it will be assumed that these valves are in the "on" condition and air is applied as indicated by the darkened arrows adjacent these ports. Under this condition, the cylinder 129 has no air in it and the springs 32 have, accordingly, pulled back on the lever 126, thereby lifting the stop 124, and the movement of the buck structure 2 back to the loading position has caused the engagement of the plate 119A on rocker arm 119, thereby forming a firm stop by means of which the drag link 116 is held and this has caused the operating rod 66 of the buck structure to be elevated as the buck is moved, in its previous operation to the loading position. Accordingly, the collar clamp was moved to the open position where it remains and rod 66 then drew down clear; the sleeve supports 136R and 136L are in the retracted position shown in Figure 6, the wings 49R and 49L are likewise retracted, and the tail clamp mechanism 137 is moved to the out position shown in Figure 21.

The operator then takes a shirt which has previously been processed through several pressing operations which results in the pressing of all areas of the shirt except for the right and left front panels R and L, Figure 1, and the back of the shirt. With the collar in the flat condition (unfolded so as to all lie in one plane), the shirt is then dressed onto the buck 2 and put in the position shown in Figure 1. The operator locates the button of the collar and the button-hole of the opposite portion of the collar appropriately and then pulls down on the knob 214 to bring the clamping plate 110 into engagement with the collar button and collar button-hole areas, thus firmly holding them in place. The operator then smoothes the back of the shirt down against the buck by reaching around the sides of the buck and pulling down and slightly forward on the shirt-tail. Any wrinkles over the yoke of the shirt are also smoothed out at this time. Then the operator grasps the lower portions of the button strip BS and the button-hole strip BHS and holds them down and draws them towards each other, as indicated by the arrows force component 112 and 113 of Figure 1. The operator then places her foot on the treadle 135. Air then enters from supply 336 of timer valve 348 through the normally open valve 365. Air continues via line 367 to port 398 of the treadle-operated valve 397. The operation of the treadle 135 closes off the exhaust port 399 and permits air to flow through valve 397 from port 398 to port 402, whence it continues via line 396 to junction 395. Air at junction 395 continues via line 407 through check valve 408 and line 410 to valves 299, which at this time is the "unguarding" of door 8 (see Figure 1) position, and hence the pin 309 of the door 8 has not operated the valve 299. Air accordingly does not at this time pass through the valve 299 but simply stands against the valve ready to be used.

From junction 395 air passes via line 394 into the cylinder 129, which therefore moves the lever 122 in a counterclockwise direction, as shown in Figures 17 and 2. This has the effect of lowering the stop 124, see Figure 2, from the full line to the dotted line position 124A, and due to the pressures exerted by the various springs within the buck 2, the control rods 66—66A within the buck structure, move downwardly and thus also move the drag link 116, and the rocker arm 119 from the full line position as shown in Figure 2 to the dotted line position. When this occurs, all of the movable elements of the buck 2 are actuated from the position shown in Figure 6 to the position shown in Figure 7. This has the effect of projecting the buck wings 49R and 49L so as to draw the shirt taut upon the buck, at the same time the tail clamp mechanism 137 is operated to hold the lower portion of the shirt. Likewise, the sleeve supporting rods 136R and 136L are projected outwardly.

While still maintaining pressure on the foot pedal 135, the operator then takes hold of the handle 8A on the door 8 and moves it from the position shown in Figure 2 to a fully projected position, as illustrated in Figure 17, and when this occurs, the pin 309 on the door enters into engagement with the actuating plate 308 of the valve 299 and air under pressure is admitted through the valve via line 411 to junction 412. From junction 412 air under pressure extends through line 371 to the normally closed valve 369 of the timer 348. This valve remains closed until the timer has operated it and hence, no flow occurs through this line at this time. From junction 412, air under pressure is also admitted via line 414 to junction 415 and from the latter to line 416 to port 327 of the pilot cylinder of valve 326. Air is also admitted through line 417 and air rate flow control valve 418 to port 325 of the pilot cylinder of valve 315. The piston 328 of pilot valve 326 is immediately pushed downwardly against the action of spring 329. The first thing that occurs is for the valve port 334, which normally maintained a clear passage through the exhaust channel 331 to the exhaust port 330, to descend into engagement with the valve point 335 of the movable valve element 336. This closes off the exhaust port 330. Further downward movement of the piston 328 then pushes the valve element 336 from its normally closed to its normally open position, against the action of spring 341. This causes the valve port 338 to be opened and will allow flow from port 340 to port 342 of valve 326. This is preparatory. At the same time, communication is established via port 344 and channel 345 to port 346 to the top of piston 328 which at this time is down.

Air under pressure against the piston 316 of the other pilot valve 315 causes that piston to be moved to the right as shown in Figure 17. It may be explained that the valve 315 has a normal position with the piston 316 to the left as shown in Figure 17, and when this occurs, communication is established between port 318 and port 322 and between port 319 and port 324. Thus, before the piston 316 has been operated as now indicated, the air under pressure standing against port 318 has been in communication with the port 324 and through the air flow regulator valve 436 and via line 435 to port 434 of the cylinder 78. Air under pressure on this port of cylinder 78 has caused the piston rod 79 to be moved in the direction of 104, which therefore caused the buck to be moved to the loading position. Now, however, when the piston 316 of valve 315 is moved to the dotted position, i. e., to the right, as shown in Figure 17, communication between port 321 and port 322 is interrupted and instead, port 322 is connected to the air supply port 318. Likewise, communication between the air supply port 318 and port 324 which had been in effect is interrupted, and port 324 is connected to the exhaust port 319 and exhaust muffler 320. Air under pressure thus entering from supply port 318 to port 322 is communicated via line 427 to junction 428. This applies pressure via line 429 to port 340 of valve 326, and since the valve element 336 has been operated, air under pressure is then communicated through valve port 338 to port 342 and thence via line 377 to valve 375. The valve 375 is normally closed until its valve stem 374 is actuated by engagement of the adjustable stop screw 372 therewith. At this time therefore, valve 375 is closed since the adjustable stop screw 372 is carried on the rocker arm 119, and it is assumed that the buck has not yet been pulled all the way to the pressing position between the presser head 36 and 37. Accordingly, air is standing against the valve 375 preparatory to actuation of the presser heads, but such does not yet occur.

Referring again to junction 428, air also then passes through the air flow regulator valve 430 and via line 431 to port 432 of the cylinder 78. When the air is applied to this port, the piston rod 79 is pushed in the direction of arrow 102, which causes the buck to be drawn from the left to the right as shown in Figures 1 and 2, that is to say, from the loading to the pressing position. Therefore, the cylinder piston 78 begins to actuate, and at a rate which is determined by the air flow regulator valve 430. The buck then begins its movement toward the pressing position. The operator meanwhile holds her foot on the treadle 135 which actuates the valve 397 until the buck has moved sufficiently to allow the pivot pin 114 to move past the vertical position 114B, see Figure 2. When this occurs, further movement of the buck 2 to the right, as shown in Figure 2, begins to lift the drag link 116 and to draw upwardly the rocker arm 119. After the rocker arm 119 has been drawn upwardly to or above the full line position, as shown in Figure 2, the plate 119A can no longer remain in engagement with the stop 124 even though the stop 124 should be permitted to rise to that position from its depressed position 124A. Therefore, the buck clamping mechanisms will remain in the clamped position and the operator can then move her foot from the treadle 135, which has the effect of removing air from the cylinder 129. The exhaust of air from this cylinder is from port 392 of cylinder 129 to line 394, thence to junction 395, thence through line 396 to the valve 397, which is in the de-actuating condition. Air is accordingly no longer supplied from port 398 to port 402, but port 398 is closed off and port 402 is put into communication with port 399, thereby permitting exhausting of the air through the flow regulator valve 405 and the exhaust muffler 406. It will be noted that air is also exhausted from line 407, but not from line 410 since the check valve 490 prevents flow in this direction. The rate of exhaust of the cylinder 129 is controlled by the flow valve 405 and therefore cushions the retraction of the lever 122 under the influence of spring 32.

As piston 79 moves in the direction of arrow 102 to its final position in which the buck is between the presser heads 36 and 37, the rocker arm 119 is drawn to a position wherein pivot pin 114 on drag link 116 is located at 114D, in Figure 2. In this position, the rocker arm lever 119 is well to the right and the adjustable stop screw 372 then enters into engagement with the valve stem 374 of valve 375. This screw can be very accurately adjusted so as to time the admission of air to the squeezing cylinder 232 when the buck has reached an exact position between the presser heads 36 and 37. The actuation of valve 375 then permits air (which has been standing under pressure against valve 375) to continue from line 377 through line 379 through the air flow rate control valve 391 to port 390 of the quick exhaust valve 381. Air under pressure moves through channel 389 around the valve disc 384 and against its lower surface as shown in Figure 17, thereby closing off the exhaust port 386. Air then continues through the port 382 and the large pipe 380 to the squeezing cylinder 232. The rate of actuation of the piston in cylinder 232 is controlled by the rate control valve 391, which is adjustable for determining the speed at which the presser heads 36 and 37 close upon the buck.

The movement of the rocker arm 119 from the full line to the dotted line position, as shown in Figure 17, also draws the spring 352 around and thereby imposes the force upon the lower end of the actuating lever 350 of the timer valve 348. Normally, this lever rests against the adjustable stop screw 351 as already described, but when the lever 319 is in the dotted line position of Figure 17, the lever 350 will be drawn in a counterclockwise direction, thereby causing the shaft 349 to rotate the lever 356 in a counter-clockwise direction. The first effect of this rotation is to remove the pin 362 from engagement with the stem of valve 365 and this shuts off the flow of air through, from supply 366 to line 367 and thence against the valve 397. This is an optional safety feature. If desired valve 365 may be discarded and air supply connected to line 367 as in Figure 18. Then after a certain time period which is determined by the rate of rotation of the lever 356, the pin 364 will enter into engagement with the stem 368 of the normally closed valve section 369 of the timer valve 348. The rate of rotation of the lever 356 (and hence the "timing") is determined by the dash pot 358 and this is, in turn, controlled by the adjustment 361 on the by-pass line 360 of the oil dash pot. Accordingly, after a certain length of time, the normally closed valve 369 is opened and this permits all circuits connected to line 371 to be exhausted to atmosphere through the line 370. Accordingly, the junction 412 is exhausted back to the check valve 409, and including the valve 299. This is preparatory to subsequent operation. The line 414 is also exhausted via junction 412, and this removes air under pressure from the operating sides of the pilot piston 328 of valve 326 and pilot piston 316 of valve 315. Accordingly, each piston is moved to its full line position as shown in Figure 17 under the influence of internal springs in the valve. However, the rate of exhaust of the air against pistons standing against piston 316 is regulated by the air flow rate control valve 418. By adjustment, this valve can delay the initiation of out-travel of the buck until after the presser heads 36 and 37 start to open. However, the movement of the piston 328 is not delayed, and its first effect is to close the valve 337 against the seat 338, and then to open the valve 334—335. This has the effect of exhausting line 377 to atmosphere via port 330. The line 377 exhausts through valve 375 and line 379 and the rate control valve 391 to port 390 of the quick exhaust valve 381. As soon as pressure is reduced slightly in the quick exhaust valve 381, it will permit the diaphragm valve washer 384 to move away from its seat 386 and then the air can very quickly exhaust around that valve through the large exhaust port 387 to atmosphere. The use of the quick exhaust valve 381 has the effect of very quickly exhausting the cylinder 232 as soon as the pressure in the line 379 is slightly reduced. Accordingly, the presser heads 36 and 37 can be caused to quickly open. Meanwhile, due to the delaying action of the rate control valve 418, piston 316 of the valve 315 has moved to the left (full line position) as shown in Figure 17, thereby re-establishing communication between ports 322 and 321 and between ports 324 and 318. Air under pressure is thereby introduced through the air flow rate control valve 436 to port 434 of cylinder 78, which therefore causes the piston 79 to be retracted (move in the direction of arrow 104, Figure 17) and this begins moving the buck out from between the then open heads 36 and 37. The rate at which it does so is adjustable at valve 436. As the piston rod 79 moves in the direction of arrow 104, this has the effect of driving the air which was already under pressure in the opposite end of the cylinder out through the port 432. This air then moves through the rate control valve 430 to junction 428, where it stands in line 429 against the now closed valve 337—338. However, the air is free to move from junction 428 via line 427 and port 322, thence through valve 315 to port 321 and via line 426 to junction 422. From junction 422, the air can move in two directions. It moves through the line 424 and the rate control valve 425 and through exhaust muffler 426 to atmosphere. However, the rate control valve 425 is pinched down and, accordingly, some of the air is forced from junction 422 to travel through the rate control valve 421 and line 420 into the port 419 of the cylinder 292, thereby causing the piston rod in this cylinder to be actuated to the right in Figure 17. This moves the lever 283 in a counter-clockwise direction, thereby retracting the door 8 from its guarding position to the unguarding position shown in Figure 1. However, as the piston 292 has been fully actuated, the air standing at junction 428 may gradually exhaust through the rate control valve 425 to exhaust muffler 426 and to atmosphere.

*Modified control circuits.*—In Figure 18, there is illustrated a slight modification of the circuits wherein the hydraulic timer 348 is replaced by an electrical timer. According to this modification, the only changes that are made in Figure 17 are as illustrated in Figure 18. Thus, at the treadle controlled valve 397, instead of port 398, being fed via line 367 through the normally open valve of the timer 348, air under pressure is introduced directly at port 398 via arrow 460.

By reference to Figure 17, it will be observed that junction 412 is the junction which is exhausted through the line 371 and through the normally closed timer controlled valve 369 to atmosphere at 370. Accordingly, the timing of the exhausting of pressure at junction 412 controls the over-all time cycle of the press. According to the modification shown in Figure 18, the line 371 (of Figure 17) to the hydraulically controlled valve 348 is discarded, and a new air circuit is established via line 461 to junction 462, whence the circuit continues by line 464 to a pressure actuated switch 465. The switch has a contact 466 which closes the circuit between terminals 467 and 468 when pressure is applied to the diaphragm in the switch 465. The switch has a contact 466 which closes the circuit between terminals 467 and 468 when pressure is applied to the diaphragm in the switch 465. Also, from junction 462 an air circuit extends via line 469 to a solenoid control valve 470, which is open when the solenoid 471 of the valve is de-energized but is closed to exhaust line 472 and exhaust muffler 474 when the solenoid 471 is energized. An electric circuit extends from line L1 through switch contact 466 and from switch contact 468 to junction 475, thence over line 476 to terminal 479 of an electric timer. From the opposite terminal 480 of the timer, a circuit extends, via line 481, to junction 482 which is energized from line L2. Likewise from junction 482, a circuit extends, via line 484, to terminal 485 of the electric timer, this being one of the terminals of the controlled circuit of the timer. From the other terminal 486 of the controlled circuit of the timer, a circuit extends via line 487 to terminal 488 of the solenoid and thence from terminal 489 of the solenoid to junction 475. The electric timer, which will be incorporated in the present invention as in the combination shown, is of that type which is energized at terminals 479 and 480 and then operates electrically to control (open and close) contacts 486—485. When terminals 479—480 are de-energized contacts 485 and 486 are "open." When power is applied to terminals 479 and 480, the timer immediately starts running. Also, immediately the timer clutches in a contact which establishes a circuit between terminals 486 and 485, which are the controlled terminals. During the press cycle, when pressure is established at junction 412 of the air line, it will accordingly close the circuit to the pressure actuated switch 465. The closure of switch 466 against contacts 467 and 468 immediately establishes the circuit from line L1 to terminals 467, thence to terminal 468 and junction 475 and via line 476 to terminal 479 of the electric timer, and therethru to terminal 480 and line 481 to junction 482 on line L2. This starts the timer in operation. The immediate action of the timer is to close the circuit between its terminals 485 and 486, thus completing the circuit from junction 475 through leads 489 and 488 of the solenoid 471, and via line 487 to terminals 486, thence to terminal 485 (since these are then closed) and via line 484 to junction 482 on line L2. The solenoid 471 is accordingly energized and when so energized, will close the air valve 470 thus closing exhaust. The action of the electric timer is so instantaneous that there is no appreciable exhaust of air between the time air pressure is applied via line 461, and pressure switch 465 is actuated, and the solenoid valve 470 is closed. The electric timer then continues to operate for the time interval during which the press is to remain closed during the pressing operation and while doing so air pressure is held at junction 412, the control junction. The time interval is made adjustable in the electric timer mechanism by means of an external control knob 488. At the end of the selected time interval, the electric timer opens the circuit between its contacts 485 and 486. This de-energizes the solenoid 471, which therefore bleeds air from the junction 412, and the press then opens and the buck moves to the loading position, as previously described with reference to Figure 17. At the same time air is exhausted from the line 464 leading to the pressure actuated switch 465, thereby opening its contacts 466 from engagement with 467 and 468. This serves to de-energize the timing motor of the electric timer and it re-sets timer preparatory to another cycle.

It is apparent that many modifications and variations of this invention as hereinbefore set forth may be made, without departing from the spirit and scope thereof. The specific embodiments described are given by way of example only and the invention is limited only by the terms of the appended claims.

What is claimed is:

1. A press for finishing the body portions of shirts comprising a frame having mounted thereon, a padded buck having longitudinal axis and a generally elliptical cross sectional shape of substantially uniform dimension from one end to the other, said buck having a major division plane thru said longitudinal axis and the major axis of said cross-section ellipse shape, thin buck wings mounted for variable extension movement in said major division plane, a pair of presser heads symmetrical about said major division plane and each having flat portions extending at opposite sides for contacting opposite faces of said wings, said flat portions being smoothly connected to semi-elliptical recesses shaped to conform to, said buck, said heads being shaped so as together to embrace all but the edges of said wings and said buck when said heads are brought against opposite portions of said buck symmetrically in respect to said major division plane, means for moving said buck from a loading position, thence by a translatory motion edgewise and parallel to said division plane to a position between said heads, means for then moving said heads simultaneously toward each other and into contact with said buck with ironing pressure and for simultaneously imparting to each of said heads a slight component of motion in a direction parallel to the longitudinal axis of said buck.

2. The press of claim 1 further characterized in that said means for moving said heads comprises for each head a pair of parallel levers set against each other and movable in a common plane, one being a main operating lever and the other a stabilizing lever, the main operating levers of the pair of presser heads being each connected by a buck to a common pneumatic cylinder which when energized moves the levers in a direction to bring the heads together and bias means for pulling said presser heads apart.

3. The press of claim 2 further characterized in that the longitudinal axis of said buck is substantially vertical and the pairs of parallel levers of both presser heads operate in the same common plane, said plane being inclined in respect to the vertical, and toward said longitudinal axis when the buck is in a position between the presser heads.

4. The press of claim 1 further characterized in that the presser heads are enclosed in an enclosing shield having a slot therein aligned with said major division plane to permit said head to move from a position external of said shield to a position between said heads and within said shield.

5. The press of claim 4 further characterized in that at a movable shield is provided for closing off free access to said slot when the buck is moved thereinto.

6. A pressing machine for the body portion of shirts and the like garments comprising a frame, said frame having an operator station at which an operator may load a garment on said buck and remove a garment therefrom and a pressing station, a generally horizontal trackway on the frame extending from said operator station to said pressing station, a carriage mounted for movement on said trackway back and forth between said stations, carriage operating motor means mounted on the frame and connected to said carriage for so moving said carriage, a generally upright buck mounted on said carriage for movement therewith, said buck being shaped for receiving said garment, an enclosure at said pressing position for substantially completely enclosing said buck at the operator station, said buck being freestanding and exposed at said operator station, said enclosure having an opening therein thru which the buck is movable into said enclosure, and a guard door on said enclosure mounted so as to be movable relative thereto from an out-of-the-way position to a position such that said opening is guarded.

7. The pressing machine of claim 6 further characterized in that a control is provided and connected to said carriage operating motor means for initiating operation thereof for moving the carriage and buck from the operator station to the pressing station when the guard door is moved to guarding position.

8. The pressing machine of claim 7 further characterized in that said control includes automatic timer means for actuating said carriage operating motor means in a direction to move said buck out of said enclosure after a time interval has elapsed.

9. The apparatus of claim 8 further characterized in that door operating means is provided for moving said guard door to its out-of-the-way position when said buck is moved out of said enclosure.

10. The apparatus of claim 9 further characterized in that said door operating means is a separate motor means connected to said door and connected to said control for actuation responsive thereto.

11. In a pressing machine for the body portion of shirts, coats and the like garments, the subcombination comprising a stationary frame having a trackway thereon extending from a loading station to a pressing station, a body shaped buck mounted on the trackways for movement therealong from one station to the other and a buck travel motor for so moving said buck, a plurality of movable instrumentalities on the buck for shaping the sides of the shirt and clamping the body of the garment during pressing and a common actuator on the buck connected to said instrumentalities for actuating them to and from their respective positions in which they are effective to shape and clamp the garment, a lever pivotally mounted on said frame and a link connecting said common actuator and lever whereby they are moved in unison and manually controlled means for permitting movement of said lever and hence said common actuator and instrumentalities to their respective effective positions for shaping and holding said garment when the buck is at said loading station.

12. The subcombination of claim 11 further characterized in that bias means is provided in said buck for normally biasing said actuator in a direction of movement such that said instrumentalities are in garment holding and stretching condition and means is provided on said frame for determining movement of said lever and hence determining movement of said actuator in a direction opposite to that to which it is moved by said bias means, as said buck moves towards loading position.

13. The apparatus of claim 11 further characterized in that said instrumentalities include a collar clamp and a manual actuator for moving it to and from actuating condition and said common actuator is shaped to operate said collar clamp from clamping to unclamping condition when the buck moves to loading position.

14. The apparatus of claim 11 further characterized in that said instrumentalities include wings on the buck for stretching the girth of the shirt and a shirt-tail clamp each spring-connected to said actuator for actuation thereby.

15. The subcombination comprising a frame, a generally horizontal trackway on the frame, a carriage movable therealong from a loading station to a pressing station, a buck mounted on said carriage, said buck having steam cavities therein, flexible steam and steam condensate lines extending from a support below the trackway, thence in a direction towards said loading station, thence curved upwardly and thence in a direction towards said pressing station, and thence to connections on said carriage to said steam cavities in said buck.

16. The subcombination of claim 14 further characterized in that said carriage includes an upright support and said buck includes spaced halves each attached at its lower end to said support, each of said halves being provided with a steam cavity attached to said lines.

17. In a pressing machine for garments, the subcombination comprising a frame, a generally horizontal trackway on the frame, a carriage mounted on the trackway for movement therealong from a loading position to a pressing position, a garment buck on said frame, a two-way actuatable air cylinder and piston motor on the frame, and motion multiplying flexible cable and pulley means connecting the piston thereof to said carriage for moving the carriage.

18. The subcombination of claim 17 further characterized in that two flexible cables are connected respectively to opposite sides of said carriage approximately in alignment with the center thereof, said flexible cables being stretched away from said carriage parallel with said trackway and thence run over pulleys adjacent the ends of said track to said piston for movement thereby.

19. The subcombination of claim 17 further characterized in that said piston is provided with a pulley for each cable, the cables from opposite sides of said carriage after being brought around said pulleys adjacent the ends of said carriage are returned each around a pulley therefor which is journalled on said piston and thence to oppositely spaced anchorages on said frame.

20. A pneumatically driven pressing machine for the body portions of garments such as shirts, coats and the like comprising a frame having a trackway, a buck mounted thereon and a buck travel cylinder connected thereto for moving the buck to pressing position when said cylinder is energized in pressing direction and for moving said buck to loading position when said cylinder is energized in loading direction, said buck having garment clamping and stretching mechanism thereon and an actuator therefor, and a buck mechanism cylinder connected to said actuator for controlling actuator operation when said buck mechanism cylinder is energized, a pair of presser heads at the pressing station, head mounting means mounting the presser heads on the frame, means for normally biasing said heads to spaced open position under which condition the buck may enter between the presser heads, and a presser, cylinder connected to the head mounting means for moving the heads towards each other and into contact with the buck for ironing a garment thereon, when said presser cylinder is energized, air supply circuits connected to the cylinders and controls therefor including an automatic sequence control and manual sequence initiating means connected to the sequence control for initiating actuating of the buck mechanism cylinder and then actuating the automatic sequence control which in a succession of steps energizes the buck travel cylinder to pressing direction, then energizes and subsequently after a time delay interval de-energizes the presser cylinder and then re-energizes the buck travel cylinder to the loading direction.

21. The pressing machine specified in claim 20 further characterized in that rate controls are provided for timing the rate of occurrence of said succession of steps.

22. The pressing machine specified in claim 20 further characterized in that said automatic sequence control includes manually regulatable timer means for pre-setting the duration of said time delay interval.

23. The pressing machine specified in claim 22 further chracterized in that said timer means is hydraulically operated.

24. The pressing machine specified in claim 22 further characterized in that said timer means is electrically operated.

25. The pressing machine of claim 20 further characterized in that said manual sequence initiating means includes a first operator actuated device energizing said buck mechanism cylinder and establishing a preparatory condition for a second operator actuated device which, when actuated initiates actuation of said automatic sequence.

26. The pressing machine of claim 25 further characterized in that said second operator actuated device is in the form of an operator protective guard which is effective to initiate actuation when the guard is in protecting position.

27. The pressing machine of claim 26 further characterized in that a guard retracting cylinder is provided and connected to said protective guard to retract the same co-incidental with energization of said buck travel cylinder to the loading direction.

28. The pressing machine of claim 27 further characterized in that the conduit means including exhaust rate control means is provided connecting the buck travel and guard retracting cylinders for conveying to the guard retracting cylinder the air exhausted from the buck travel cylinder co-incident with its energization to loading direction.

29. A press for finishing the body portion of shirts and the like garments comprising an upright body-like buck having front and back faces, said buck being so shaped that the body portion of the shirt may be dressed thereon, a pair of presser heads for embracing and substantially enclosing said buck, a mechanism for moving each of said heads simultaneously in opposite directions towards and away from each other and means for translating the buck along the planar path of travel from a loading position to a position between the heads when they are apart and for maintaining said buck in substantially said planar path when the presser heads embrace and substantially enclose said buck and automatic means operable when the buck is between the heads for generally translating each head simultaneously substantially equal distances to simultaneously embrace opposite faces of the buck to apply equal ironing pressure to the front and back faces thereof.

30. The apparatus of claim 29 further characterized in that said means for translating said buck comprises a carriage movable upon spaced tracks.

31. The apparatus of claim 29 further characterized in that said spaced tracks are parallel rods and said carriage has a bearing embracing one of said rods and rollers operating upon said other rod for steadying said carriage.

32. The apparatus of claim 29 further characterized in that said tracks include a rod supported from its ends and said buck is carried on a carriage thereon, and means is provided for slowing down the rate of motion of the carriage as it moves toward a position at each end of the said rod.

33. The press defined in claim 29 further characterized in that said mechanism for moving said heads towards and away from each other simultaneously moves the heads substantially parallel to said buck for ironing the garment thereon as it is pressed.

References Cited in the file of this patent
UNITED STATES PATENTS

| | | |
|---|---|---|
| 2,126,577 | Rawlinson | Aug. 9, 1938 |
| 2,203,359 | McDougall | June 4, 1940 |
| 2,241,373 | Rawlinson et al. | May 6, 1941 |
| 2,395,466 | Couch | Feb. 26, 1946 |
| 2,698,705 | Hitz | Jan. 4, 1955 |
| 2,743,854 | Strike | May 1, 1956 |
| 2,757,832 | Johnson et al. | Aug. 7, 1956 |
| 2,757,833 | Petrie | Aug. 7, 1956 |
| 2,788,162 | Hitz | Apr. 9, 1957 |

UNITED STATES PATENT OFFICE

CERTIFICATE OF CORRECTION

Patent No. 2,834,523 May 13, 1958

Ira C. Maxwell et al.

It is hereby certified that error appears in the printed specification of the above numbered patent requiring correction and that the said Letters Patent should read as corrected below.

Column 20, line 32, after "means" insert -- of --; column 27, lines 29 to 32, strike out "The switch has a contact 466 which closes the circuit between terminals 467 and 468 when pressure is applied to the diaphragm in the switch 465."; column 30, line 69, after "presser" strike out the comma; column 31, line 16, for "chracterized" read -- characterized --.

Signed and sealed this 9th day of September 1958.

(SEAL)
Attest:
KARL H. AXLINE

Attesting Officer

ROBERT C. WATSON
Commissioner of Patents